US012698809B2

(12) United States Patent
Suzuki et al.

(10) Patent No.: US 12,698,809 B2
(45) Date of Patent: Aug. 4, 2026

(54) CLUTCH DEVICE

(71) Applicant: Kabushiki Kaisha F.C.C., Hamamatsu (JP)

(72) Inventors: Takayuki Suzuki, Hamamatsu (JP); Yuki Aono, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 19/263,944

(22) Filed: Jul. 9, 2025

(65) Prior Publication Data

US 2025/0334155 A1      Oct. 30, 2025

Related U.S. Application Data

(63) Continuation of application No. PCT/JP2024/010117, filed on Mar. 14, 2024.

(30) Foreign Application Priority Data

Apr. 14, 2023    (JP) ................................. 2023-066655

(51) Int. Cl.
*F16D 13/56*          (2006.01)

(52) U.S. Cl.
CPC ........ *F16D 13/56* (2013.01); *F16D 2013/565* (2013.01)

(58) Field of Classification Search
CPC .... F16D 13/56; F16D 13/71; F16D 2013/565; F16D 2023/123
See application file for complete search history.

(56) References Cited

U.S. PATENT DOCUMENTS

| | | | |
|---|---|---|---|
| 10,247,260 B2 * | 4/2019 | Kataoka ................. | F16D 43/21 |
| 11,231,074 B2 * | 1/2022 | Isobe ..................... | F16D 13/70 |
| 2019/0211886 A1 | 7/2019 | Ito et al. | |
| 2019/0285122 A1 | 9/2019 | Imanishi et al. | |
| 2020/0158194 A1 | 5/2020 | Kataoka et al. | |

FOREIGN PATENT DOCUMENTS

| | | |
|---|---|---|
| EP | 3366939 B1 | 2/2020 |
| JP | 2014224580 A | 12/2014 |
| JP | 2017172653 A | 9/2017 |
| JP | 2018141480 A | 9/2018 |
| JP | 2019158015 A | 9/2019 |
| JP | 6894792 B2 | 6/2021 |

OTHER PUBLICATIONS

International Search Report in PCT/JP2024/010117, mailed Apr. 23, 2024, 2 pages.
Official Communication issued in corresponding European Patent Application No. 24788509.8, mailed on Jun. 24, 2026, 8 pages.

* cited by examiner

*Primary Examiner* — Huan Le
(74) *Attorney, Agent, or Firm* — Keating & Bennett, LLP

(57) ABSTRACT

A clutch device includes a clutch spring to urge a pressure plate in a first direction, and a stopper plate secured to a clutch center. The pressure plate includes a spring housing located to a side of a pressure-side assist cam surface in a rotation direction of the pressure plate and housing the clutch spring. The clutch device includes a reducer to reduce a restoring force of the clutch spring in a direction from the clutch spring toward the pressure-side assist cam surface during a time period until a center-side assist cam surface and the pressure-side assist cam surface approach and contact each other from a state of being spaced apart from each other in the rotation direction.

13 Claims, 15 Drawing Sheets

CLUTCH DEVICE

CROSS REFERENCE TO RELATED APPLICATIONS

This application claims the benefit of priority to Japanese Patent Application No. 2023-066655, filed on Apr. 14, 2023, and is a Continuation Application of PCT Application No. PCT/JP2024/010117, filed on Mar. 14, 2024. The entire contents of each application are hereby incorporated herein by reference.

BACKGROUND OF THE INVENTION

1. Field of the Invention

The present invention relates to clutch devices.

2. Description of the Related Art

Conventionally, a vehicle such as a motorcycle or the like includes a clutch device. For example, Japanese Patent No. 6894792 discloses a clutch device including a clutch center holding output-side rotating plates, a pressure plate movable toward, or away from, the clutch center, and a clutch spring urging the pressure plate toward the clutch center. The clutch spring is housed in a housing portion formed in the pressure plate. One of ends of the clutch spring is in contact with the pressure plate, and the other of the ends of the clutch spring is in contact with a stopper plate secured to the clutch center. The clutch center and the pressure plate of the clutch device described in Japanese Patent No. 6894792 respectively include center-side assist cam surfaces and pressure-side assist cam surfaces, each of which generates a force in a direction from the pressure plate toward the clutch center to increase a pressing force between input-side rotating plates and the output-side rotating plates when a rotation driving force of an engine is allowed to be transferred to an output shaft.

SUMMARY OF THE INVENTION

While a clutch-engaged state is transferred to a clutch-disengaged state, that is, while the center-side assist cam surfaces and the pressure-side assist cam surfaces are transferred into a state of being out of contact with each other from a state of being in contact with each other, the pressure plate is moved in a direction away from the clutch center while rotating in a circumferential direction with respect to the clutch center. Therefore, the clutch spring housed in a housing portion may have a restoring force generated therein in a direction from the clutch spring toward the pressure-side assist cam surfaces (that is, a restoring force to restore the state where the center-side assist cam surfaces and the pressure-side assist cam surfaces are in contact with each other). In the case where such a restoring force is excessively large, while the clutch-disengaged state is transferred to the clutch-engaged state, the restoring force may cause the center-side assist cam surfaces and the pressure-side assist cam surfaces to approach each other rapidly to undesirably result in rapid clutch engagement.

Example embodiments of the present invention provide clutch devices that each reduce or prevent such rapid clutch engagement.

A clutch device according to an example embodiment of the present invention is a clutch device allowing or blocking transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, a pressure plate movable toward, or away from, and to be rotatable with respect to, the clutch center, the pressure plate holding a plurality of output-side rotating plates alternately arranged with the plurality of input-side rotating plates, the pressure plate being configured to press the input-side rotating plates and the output-side rotating plates, a clutch spring to urge the pressure plate in a first direction where the first direction is a direction in which the pressure plate moves toward the clutch center and a second direction is a direction in which the pressure plate moves away from the clutch center, and a stopper plate secured to the clutch center to reduce or restrict movement of the pressure plate away from the clutch center in the second direction by a predetermined distance or longer. An end, on the side of the first direction, of the clutch spring is in contact with the pressure plate, and an end, on the side of the second direction, of the clutch spring is in contact with the stopper plate. The clutch center includes a center-side assist cam surface to generate a force in a direction from the pressure plate toward the clutch center, in order to increase a pressing force between the input-side rotating plates and the output-side rotating plates, when the clutch center rotates with respect to the pressure plate. The pressure plate includes a pressure-side assist cam surface configured to be contactable with the center-side assist cam surface and to generate a force in a direction from the pressure plate toward the clutch center in order to increase the pressing force between the input-side rotating plates and the output-side rotating plates, when the pressure plate rotates with respect to the clutch center, and a housing portion located to the side of the pressure-side assist cam surface in a rotation direction of the pressure plate, the housing portion housing the clutch spring. The clutch device includes a reducer to reduce a restoring force of the clutch spring in a direction from the clutch spring toward the pressure-side assist cam surface during a time period until the center-side assist cam surface and the pressure-side assist cam surface approach and contact each other from a state of being spaced apart from each other in the rotation direction.

With a clutch device according to an example embodiment of the present invention, the reducer reduces the restoring force of the clutch spring in the direction from the clutch spring toward the pressure-side assist cam surface during the time period until the center-side assist cam surface and the pressure-side assist cam surface approach and contact each other from a state of being spaced apart from each other in the rotation direction. As described above, the restoring force that may be generated in the clutch spring is reduced by the reducer. Therefore, rapid contact of the center-side assist cam surface and the pressure-side assist cam surface by the restoring force is prevented. That is, rapid clutch engagement is prevented by the reducer.

Another clutch device according to an example embodiment of the present invention is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, a pressure plate movable toward, or away from, and to be rotatable with respect to, the clutch center, the pressure plate holding a plurality of output-side rotating plates alternately arranged with the plurality of input-side rotating plates, the pressure plate being capable of pressing the input-side rotating plates and the output-side rotating plates, a clutch spring to urge the pressure plate in a first direction where the first direction is a direction in which the pressure plate moves toward the clutch center and a second direction is a direction in which the pressure plate moves away from the clutch center, and a lifter plate secured to the pressure plate to reduce or restrict movement of the pressure plate away from the clutch center in the second direction by a predetermined distance or longer. An end, on the side of the first direction, of the clutch spring is in contact with the lifter plate, and an end, on the side of the second direction, of the clutch spring is in contact with the clutch center. The clutch center includes a center-side assist cam surface to generate a force in a direction from the pressure plate toward the clutch center, to increase a pressing force between the input-side rotating plates and the output-side rotating plates, when the clutch center rotates with respect to the pressure plate, and a housing portion located to the side of the center-side assist cam surface in a rotation direction of the clutch center, the housing portion housing the clutch spring. The pressure plate includes a pressure-side assist cam surface contactable with the center-side assist cam surface to generate a force in a direction from the pressure plate toward the clutch center in order to increase the pressing force between the input-side rotating plates and the output-side rotating plates, when the pressure plate rotates with respect to the clutch center. The clutch device includes a reducer to reduce a restoring force of the clutch spring in a direction from the clutch spring toward the center-side assist cam surface during a time period until the center-side assist cam surface and the pressure-side assist cam surface approach and contact each other from a state of being spaced apart from each other in the rotation direction.

With the another clutch device according to an example embodiment of the present invention, the reducer is configured to reduce the restoring force of the clutch spring in the direction from the clutch spring toward the center-side assist cam surface during the time period until the center-side assist cam surface and the pressure-side assist cam surface approach and contact each other from a state of being spaced apart from each other in the rotation direction. As described above, the restoring force that may be generated in the clutch spring is reduced by the reducer. Therefore, rapid contact of the center-side assist cam surface and the pressure-side assist cam surface by the restoring force is prevented. That is, rapid clutch engagement is reduced or prevented by the reducer.

According to example embodiments of the present invention, clutch devices that reduce or prevent rapid clutch engagement are provided.

The above other elements, features, steps, and characteristics and advantages of the present invention will become more apparent from the following detailed description of the example embodiments with reference to the attached drawings.

BRIEF DESCRIPTION OF THE DRAWINGS

FIG. 5 is a plan view of the pressure plate according to example embodiment 1 of the present invention.

FIG. 13 is a cross-sectional view of a clutch device according to example embodiment 3 of the present invention.

DETAILED DESCRIPTION OF THE EXAMPLE EMBODIMENTS

Hereinafter, clutch devices according to example embodiments of the present invention will be described with reference to the drawings. The example embodiments described herein are, of course, not intended to particularly limit the present invention. Elements and portions having the same functions are denoted by the same reference signs, and description for the same elements and portions will be omitted or simplified as appropriate.

Figure 1:
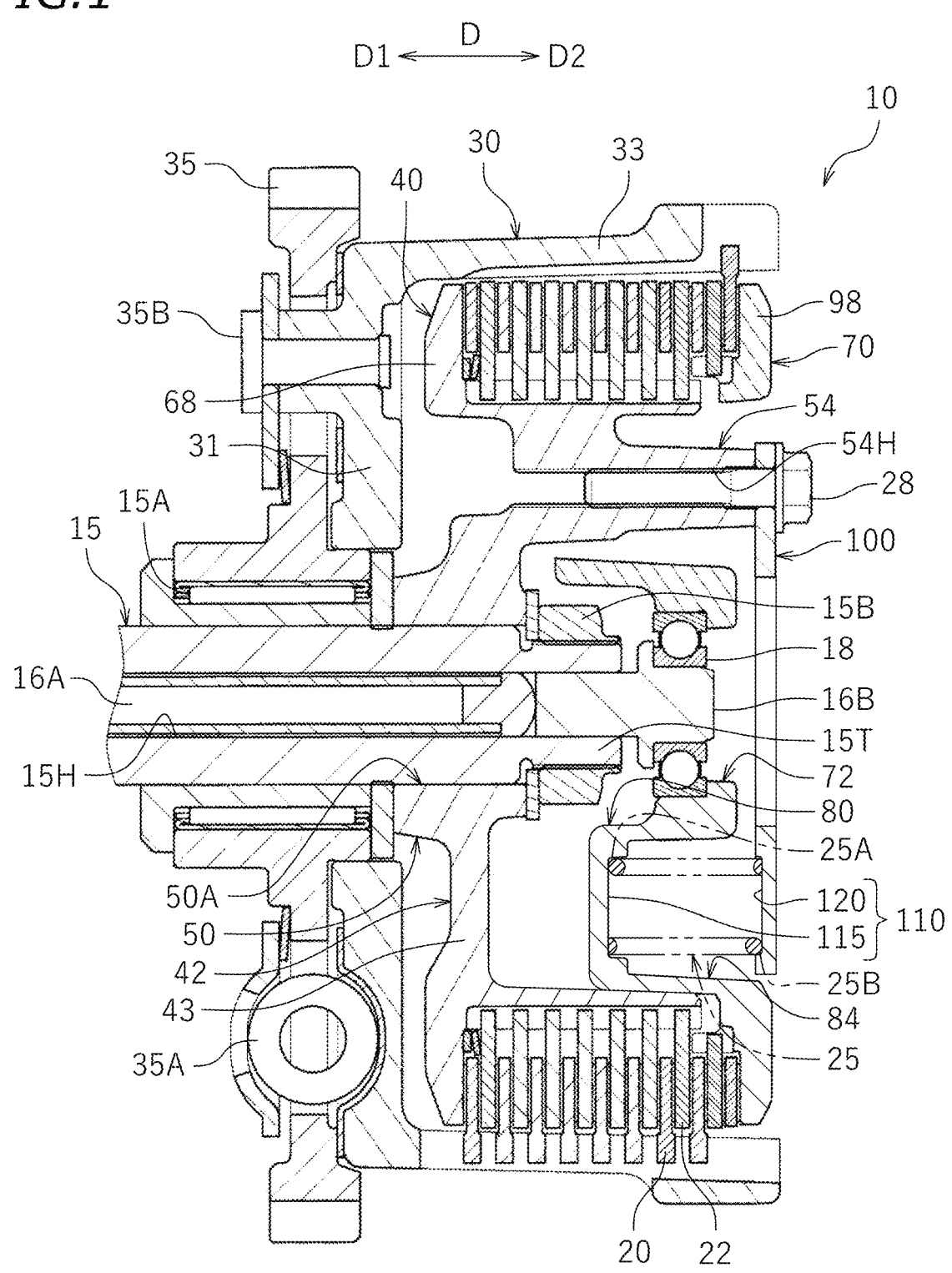
FIG. 1 is a cross-sectional view of a clutch device according to example embodiment 1 of the present invention.

FIG. 1 is a cross-sectional view of a clutch device 10 according to this example embodiment. The clutch device 10 is preferably provided in, for example, a vehicle such as a motorcycle or the like. The clutch device 10, for example, allows or blocks transfer of a rotation driving force of an input shaft (crankshaft) of an engine of the motorcycle to an output shaft 15. The clutch device 10 allows or blocks the transfer of the rotation driving force of the input shaft to a drive wheel (rear wheel) through the output shaft 15. The clutch device 10 is located between the engine and a transmission.

In the following description, a direction in which a pressure plate 70 of the clutch device 10 moves toward, and away from, a clutch center 40 will be referred to as a direction D (an example of moving direction). A direction in which the pressure plate 70 moves toward the clutch center 40 will be referred to as a first direction D1, and a direction in which the pressure plate 70 moves away from the clutch center 40 will be referred to as a second direction D2. A rotation direction (i.e., a circumferential direction) of the clutch center 40 and the pressure plate 70 will be referred to as a rotation direction S. Regarding the rotation direction S, a direction from one pressure-side cam portion 90 toward another pressure-side cam portion 90 will be referred to as a first rotation direction S1 (see FIG. 5), and a direction from the other pressure-side cam portion 90 toward the one pressure-side cam portion 90 will be referred to as a second rotation direction S2 (see FIG. 5). In this example embodiment, an axial direction of the output shaft 15, an axial direction of a clutch housing 30, an axial direction of the clutch center 40, and an axial direction of the pressure plate 70 are the same as the direction D. The pressure plate 70 and the clutch center 40 rotate in the first circumferential direction S1. It should be noted that the directions described above are defined simply for the convenience of description, and do not limit the manner of installation of the clutch device 10 in any way with respect to, for example, gravity, and do not limit the present invention in any way.

As shown in FIG. 1, the clutch device 10 preferably includes the output shaft 15, input-side rotating plates 20, output-side rotating plates 22, the clutch housing 30, the clutch center 40, the pressure plate 70, a stopper plate 100, clutch springs 25, and reducers 110. The clutch device is preferably a so-called pull-type clutch device.

As shown in FIG. 1, the output shaft 15 is preferably a hollow shaft. One end of the output shaft 15 supports an input gear 35 described below and the clutch housing 30 via a needle bearing 15A such that the input gear 35 and the clutch housing 30 are rotatable. The output shaft 15 supports the clutch center 40 via a nut 15B such that the clutch center 40 is secured. That is, the output shaft 15 rotates integrally with the clutch center 40. Another end of the output shaft 15 is preferably coupled with, for example, a transmission (not shown) of a motorcycle.

As shown in FIG. 1, the output shaft 15 includes a push rod 16A and a pusher 16B provided to be adjacent to the push rod 16A in a hollow portion 15H. The hollow portion 15H has a function of being a flow path for clutch oil to flow therethrough. The clutch oil flows in the output shaft 15, that is, in the hollow portion 15H. The push rod 16A and the pusher 16B are slidable in the hollow portion 15H of the output shaft 15. The push rod 16A preferably has one end thereof (left end in the figure) coupled with a clutch mechanism (e.g., a clutch operation lever or an operation button) of the motorcycle, and slides in the hollow portion 15H by a clutch operation made by a driver and thus presses the pusher 16B in the second direction D2. A portion of the pusher 16B protrudes outward of the output shaft 15 (in this example embodiment, in the second direction D2), and is coupled with a release bearing 18 provided in the pressure plate 70. The push rod 16A and the pusher 16B each have a diameter shorter than an inner diameter of the hollow portion 15H, so that the clutch oil is guaranteed to flow easily in the hollow portion 15H.

The clutch housing 30 is preferably made of an aluminum alloy, for example. The clutch housing 30 preferably has a bottomed cylindrical shape. As shown in FIG. 1, the clutch housing 30 includes a bottom wall 31 having a circular or generally circular shape and a side wall 33 extending in the second direction D2 from an edge of the bottom wall 31. The clutch housing 30 holds the plurality of input-side rotating plates 20.

As shown in FIG. 1, the input gear 35 is provided on the bottom wall 31 of the clutch housing 30. The input gear 35 is secured to the bottom wall 31 by a rivet 35B via a torque damper 35A. The input gear 35 is meshed with a drive gear (not shown) rotatable by rotational driving of the input shaft of the engine. The input gear 35 is rotationally drivable integrally with the clutch housing 30, independently from the output shaft 15.

The input-side rotating plates 20 are rotationally drivable by the rotational driving of the input shaft. As shown in FIG. 1, the input-side rotating plates 20 are held on an inner circumferential surface of the side wall 33 of the clutch housing 30. The input-side rotating plates 20 are held by the clutch housing 30 through spline fitting. The input-side rotating plates 20 are displaceable in the axial direction of the clutch housing 30 (i.e., in the direction D). The input-side rotating plates 20 are rotatable integrally with the clutch housing 30.

The input-side rotating plates 20 are pushed against the output-side rotating plates 22. The input-side rotating plates 20 are preferably annular. The input-side rotating plates 20 are preferably molded by die-cast with aluminum, for example. The input-side rotating plates 20 include a plurality of friction materials (not shown) formed of, for example, paper pasted on a front surface and a rear surface thereof. Grooves each having a depth of several hundred micrometers are formed between the friction materials to hold clutch oil.

As shown in FIG. 1, the clutch center 40 is housed in the clutch housing 30. The clutch center 40 is located concentrically with the clutch housing 30. The clutch center 40 includes a cylindrical body 42 and a flange 68 extending in a radially outward direction from an outer circumferential edge of the body 42. The clutch center 40 holds the plurality of output-side rotating plates 22 alternately arranged with the input-side rotating plates 20 in the direction D. The clutch center 40 is rotatably drivable together with the output shaft 15.

Figure 2:
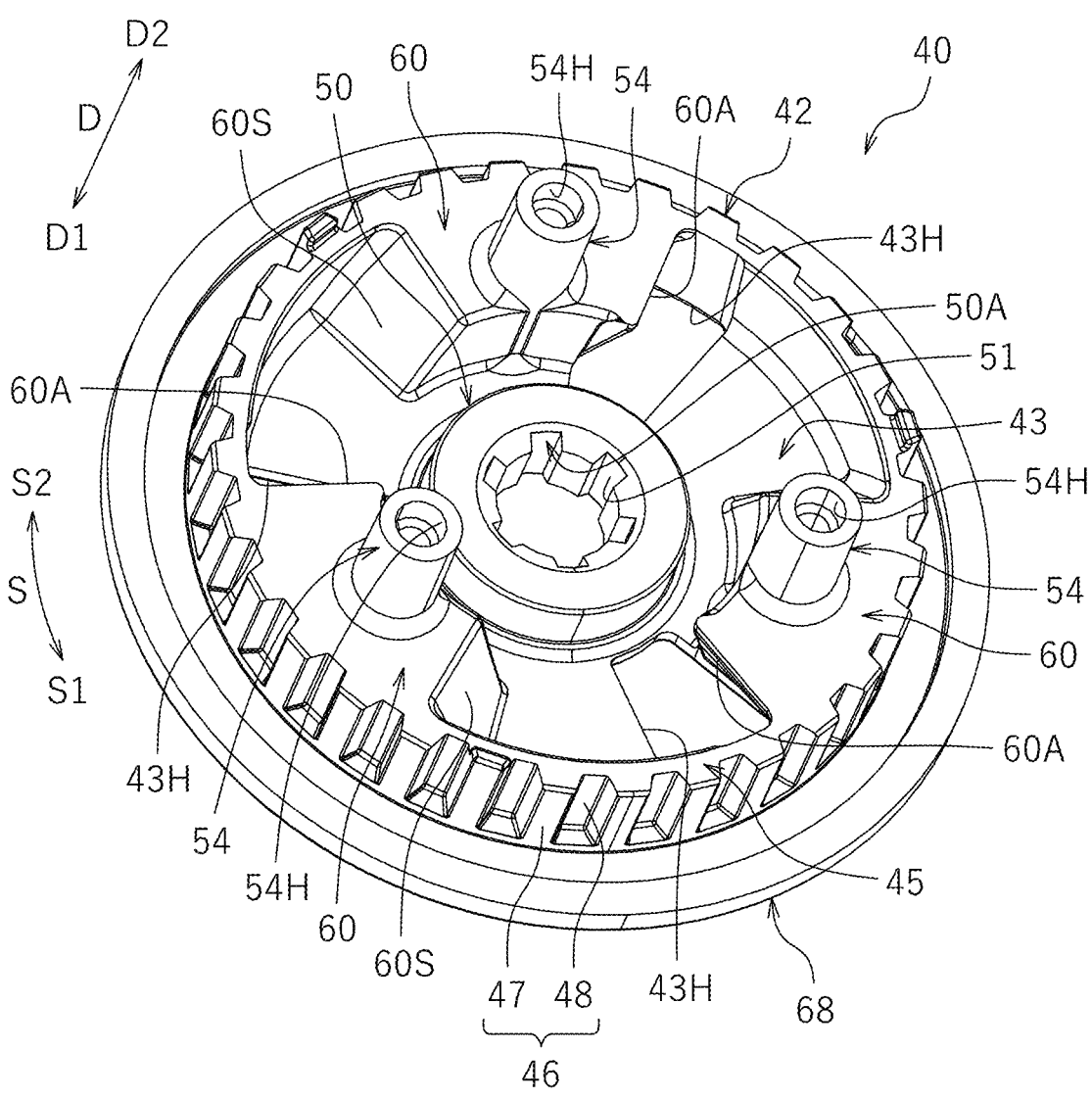
FIG. 2 is a perspective view of a clutch center according to example embodiment 1 of the present invention.

As shown in FIG. 2, the body 42 includes an annular base wall 43, an outer circumferential wall 45 located ahead of the base wall 43 in the radially outward direction and extending in the second direction D2, an output shaft holding portion 50 provided at a center of the base wall 43, and a plurality of center-side cam portions 60 connected with the base wall 43 and the outer circumferential wall 45.

As shown in FIG. 2, the output shaft holding portion 50 is cylindrical. The output shaft holding portion 50 has an insertion hole 51 therein, into which the output shaft 15 (see FIG. 1) is inserted and with which the output shaft 15 is spline-fitted. The insertion hole 51 preferably penetrates the base wall 43. An inner circumferential surface 50A, of the output shaft holding portion 50, that defines the insertion hole 51 includes a plurality of spline grooves formed therein, which extend in the axial direction. The output shaft 15 is coupled with the output shaft holding portion 50 (see FIG. 1).

As shown in FIG. 2, the outer circumferential wall 45 of the clutch center 40 is located ahead of the output shaft holding portion 50 in the radially outward direction. A spline fitting portion 46 is provided on an outer circumferential surface of the outer circumferential wall 45. The spline fitting portion 46 includes a plurality of center-side fitting teeth 47 extending in the axial direction of the clutch center 40 and arranged along the outer circumferential surface of the outer circumferential wall 45, and a plurality of spline grooves 48 each formed between adjacent ones of the center-side fitting teeth 47 and extending in the axial direction of the clutch center 40. The center-side fitting teeth 47 hold the output-side rotating plates 22. The plurality of center-side fitting teeth 47 are arranged in the rotation direction S. The plurality of center-side fitting teeth 47 are located at an equal interval in the rotation direction S. The plurality of center-side fitting teeth 47 preferably have the same shape as each other. The center-side fitting teeth 47 project in the radially outward direction from the outer circumferential surface of the outer circumferential wall 45. An outer circumferential surface of the center-side fitting teeth 47 is parallel or generally parallel to an axis of the output shaft 15.

The output-side rotating plates 22 are held by the spline fitting portion 46 of the clutch center 40 and the pressure plate 70. A portion of the output-side rotating plates 22 is held, through spline fitting, by the center-side fitting teeth 47 and the spline grooves 48 of the clutch center 40. Another portion of the output-side rotating plates 22 is held by pressure-side fitting teeth 77 described below (see FIG. 4) of the pressure plate 70. The output-side rotating plates 22 are displaceable in the axial direction of the clutch center 40. The output-side rotating plates 22 are rotatable integrally with the clutch center 40.

The output-side rotating plates 22 are pushed against the input-side rotating plates 20. The output-side rotating plates 22 are preferably annular. The output-side rotating plates 22 are molded by punching a thin plate of an SPCC material into an annular shape. The friction materials included in the input-side rotating plates 20 may be provided in the output-side rotating plates 22 instead of the input-side rotating plates 20, or may be provided in both of the input-side rotating plates 20 and the output-side rotating plates 22.

Figure 3:
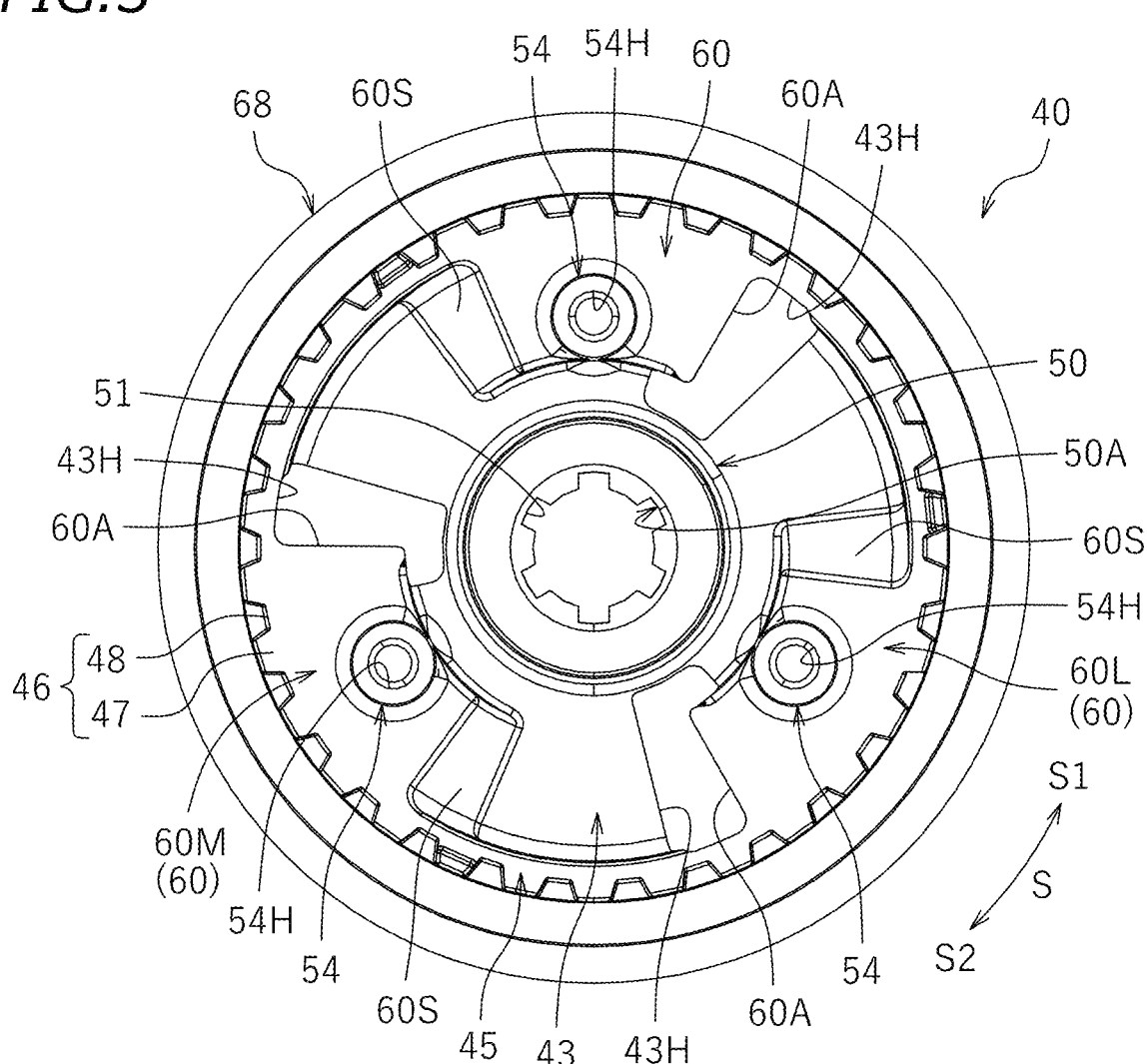
FIG. 3 is a plan view of the clutch center according to example embodiment 1 of the present invention.

As shown in FIG. 2, each of the center-side cam portions 60 preferably have a truncated quadrangular pyramid shape including a cam surface defined by a slope acting as an Assist & Slipper (registered trademark) mechanism. The cam surface as the Assist & Slipper (registered trademark) mechanism generates an assist torque as a force increasing a pressing force (contact pressure force) between the input-side rotating plates 20 and the output-side rotating plates 22 or a slipper torque as a force separating the input-side rotating plates 20 and the output-side rotating plates 22 from each other at an early stage and shifting these plates into a half-clutch state. Each center-side cam portion 60 projects in the second direction D2 from the base wall 43. As shown in FIG. 3, the center-side cam portions 60 are preferably located at an equal interval in the rotation direction S of the clutch center 40. In this example embodiment, the clutch center 40 includes three center-side cam portions 60. The number of the center-side cam portions 60 is not limited to three and can be any desirable number.

As shown in FIG. 3, the center-side cam portions 60 are preferably located ahead of the output shaft holding portion 50 in the radially outward direction. The center-side cam portions 60 each include a center-side assist cam surface 60A and a center-side slipper cam surface 60S. The center-side assist cam surface 60A generates a force in a direction from the pressure plate 70 toward the clutch center 40 (in this example embodiment, in the first direction D1), in order to increase the pressing force (contact pressure force) between the input-side rotating plates 20 and the output-side rotating plates 22, when the clutch center 40 rotates with respect to the pressure plate 70. In this example embodiment, when this force is generated, the position of the pressure plate 70 with respect to the clutch center 40 does not change, and the pressure plate 70 does not need to move toward the clutch center 40 physically. The pressure plate 70 may be displaced with respect to the clutch center 40 physically. The center-side slipper cam surface 60S is configured to separate the pressure plate 70 from the clutch center 40, in order to decrease the pressing force (contact pressure force) between the input-side rotating plates 20 and the output-side rotating plates 22, when the clutch center 40 rotates with respect to the pressure plate 70. Regarding two of the center-side cam portions 60 adjacent to each other in the rotation direction S, the center-side assist cam surface 60A of one center-side cam portion 60L and the center-side slipper cam surface 60S of the other center-side cam portion 60M are opposed to each other in the rotation direction S.

As shown in FIG. 2, the clutch center 40 preferably includes a plurality of (in this example embodiment, three) bosses 54. The bosses 54 support the stopper plate 100 (see FIG. 1). The plurality of bosses 54 are located at an equal interval in the rotation direction S. The bosses 54 are each formed to be cylindrical. The bosses 54 are located ahead of the output shaft holding portion 50 in the radially outward direction. The bosses 54 extend toward the pressure plate 70 (i.e., in the second direction D2). The bosses 54 are respectively provided on the center-side cam portions 60. The bosses 54 are each provided between the center-side assist cam surface 60A and the center-side slipper cam surface 60S in the rotation direction S. The bosses 54 each preferably include a screw hole 54H defined therein. The screw hole 54H extends in the axial direction of the clutch center 40. Bolts 28 (see FIG. 1) usable to secure the stopper plate 100 to the clutch center 40 are respectively inserted into the screw holes 54H.

As shown in FIG. 2 and FIG. 3, the clutch center 40 preferably includes center-side cam holes 43H defined therein, each of which penetrates a portion of the base wall 43. The center-side cam holes 43H each extend from a position to the side of the output shaft holding portion 50 to the outer circumferential wall 45. The center-side cam holes 43H are each located between the center-side assist cam surface 60A of one center-side cam portion 60 and the center-side slipper cam surface 60S of another center-side cam portion 60. As seen in the axial direction of the clutch center 40, each center-side assist cam surface 60A and the corresponding center-side cam hole 43H partially overlap each other.

As shown in FIG. 1, the pressure plate 70 is movable toward, or away from, and is rotatable with respect to, the clutch center 40. The pressure plate 70 is capable of pressing the input-side rotating plates 20 and the output-side rotating plates 22. The pressure plate 70 is located concentrically with the clutch center 40 and the clutch housing 30. The pressure plate 70 includes a body 72 and a flange 98 connected with an outer circumferential edge, on the side of the second direction D2, of the body 72 and extending in the radially outward direction. The body 72 projects ahead of the flange 98 in the first direction D1. The flange 98 is located along an outer circumferential edge of the pressure plate 70. The flange 98 is located ahead of a cylindrical portion 80 (see FIG. 4) described below in the radially outward direction. The pressure plate 70 holds the plurality of output-side rotating plates 22 located alternately with the input-side rotating plates 20. The flange 98 is configured to be capable of pressing the input-side rotating plates 20 and the output-side rotating plates 22.

Figure 4:
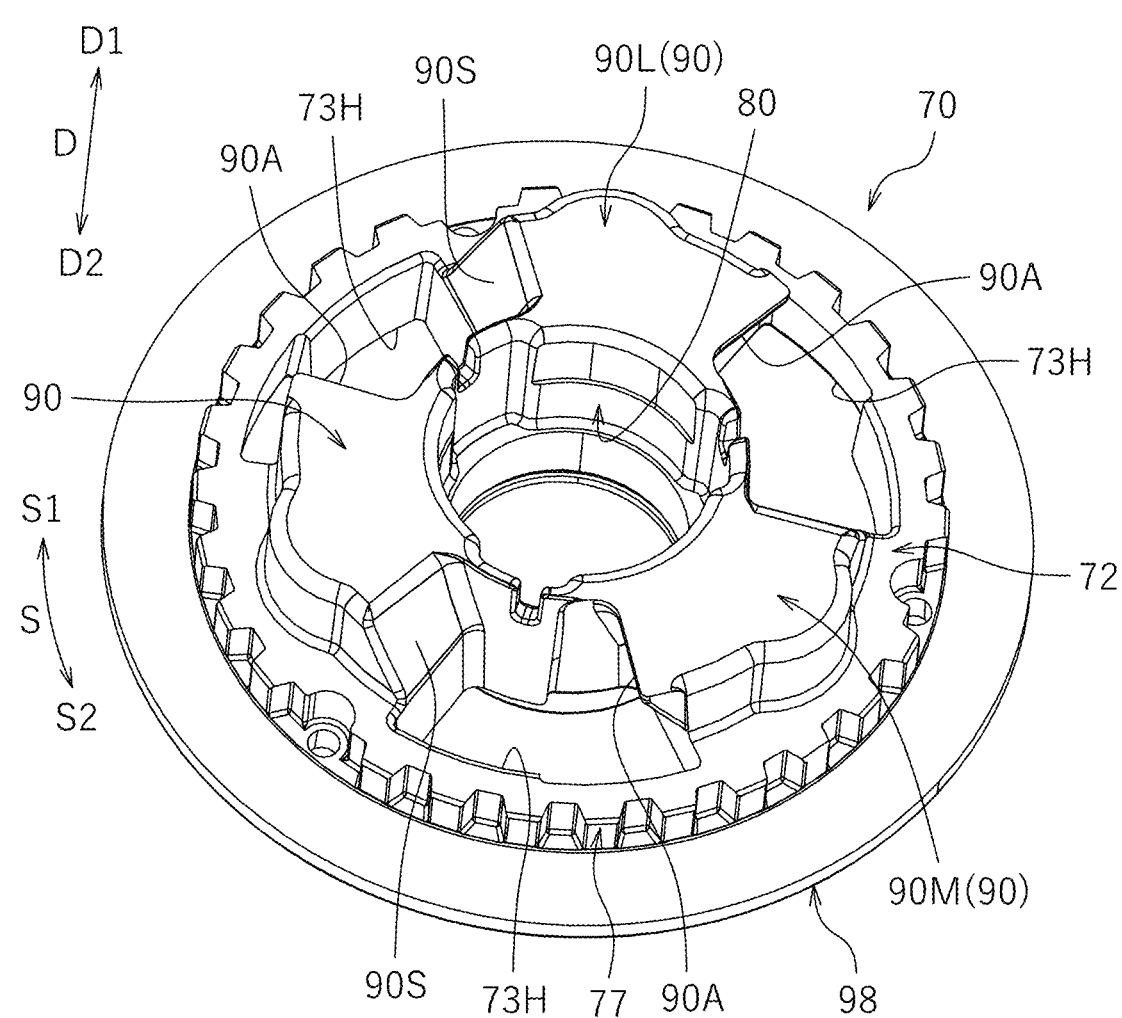
FIG. 4 is a perspective view of a pressure plate according to example embodiment 1 of the present invention.
Figure 6:
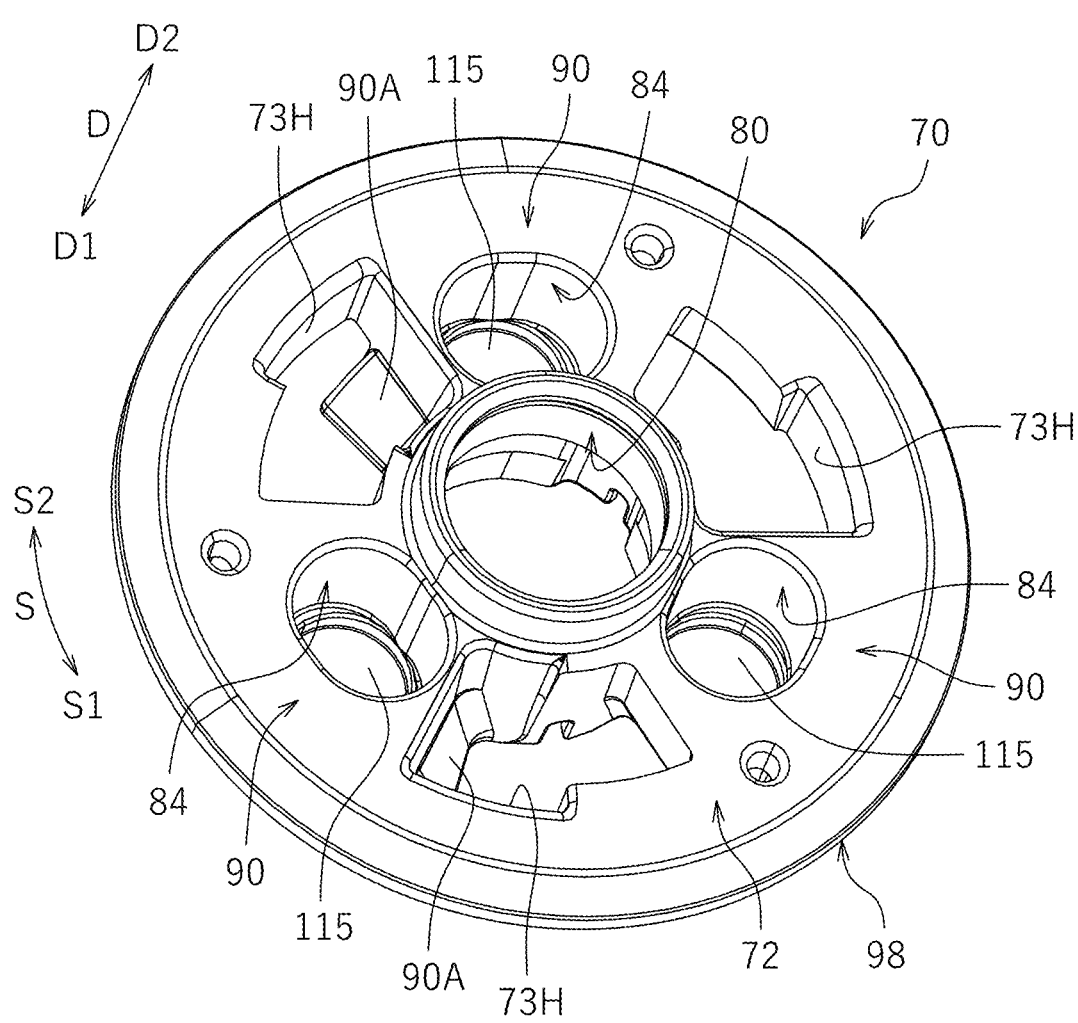
FIG. 6 is a perspective view of the pressure plate according to example embodiment 1 of the present invention.

As shown in FIG. 4, the body 72 preferably includes the cylindrical portion 80, the plurality of pressure-side cam portions 90, and spring housings 84 (see FIG. 6). The spring housings 84 are each an example of housing portion.

The cylindrical portion 80 is cylindrical. The cylindrical portion 80 is preferably provided integrally with the pressure-side cam portions 90. The cylindrical portion 80 houses a tip 15T (see FIG. 1) of the output shaft 15. The cylindrical portion 80 houses the release bearing 18 (see FIG. 1). The cylindrical portion 80 receives a pressing force from the pusher 16B. The cylindrical portion 80 receives the clutch oil flowing out from the tip 15T of the output shaft 15.

Figure 5:
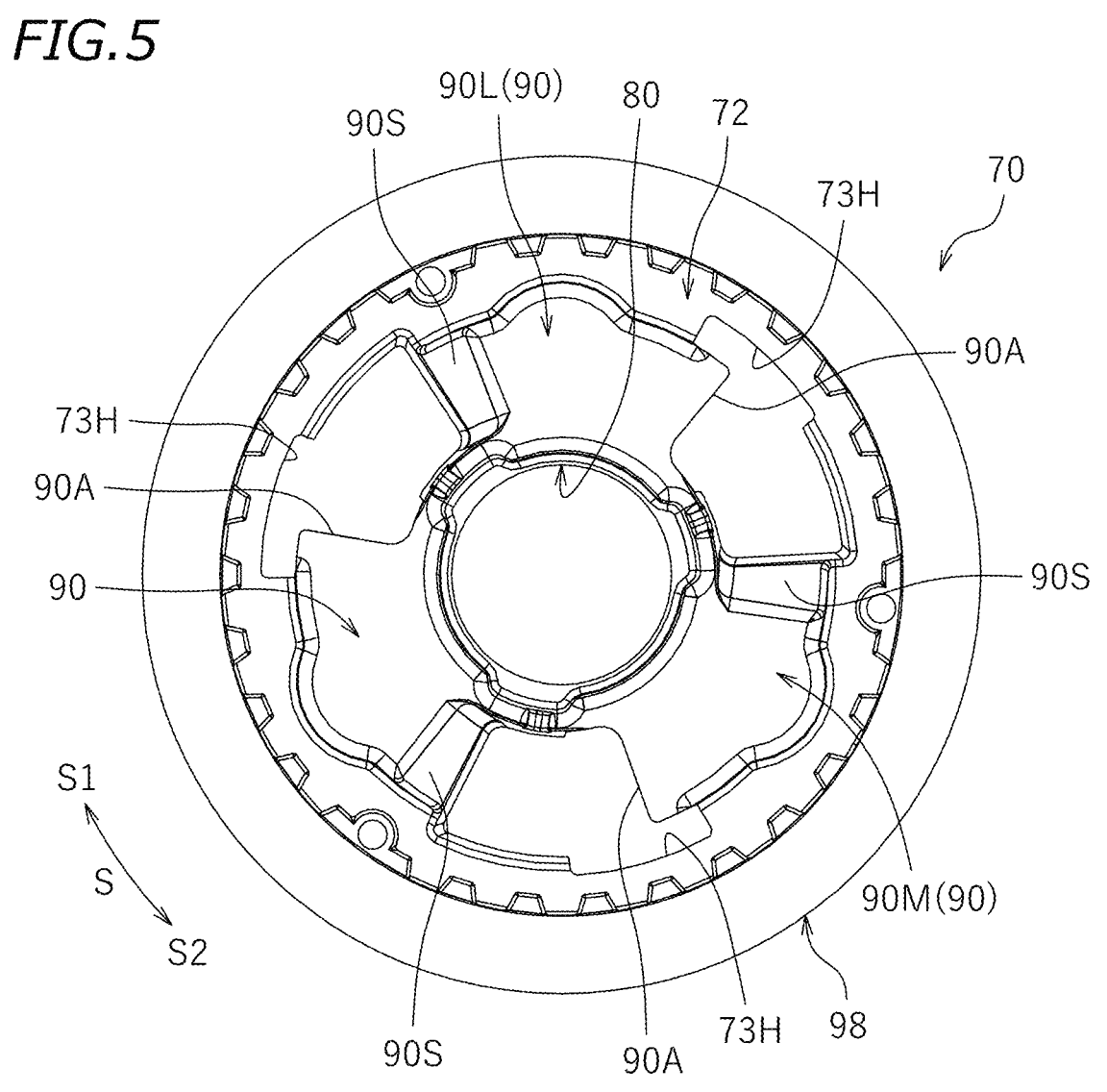

As shown in FIG. 4, each of the pressure-side cam portions 90 preferably has a truncated quadrangular pyramid shape including a cam surface of a slope acting as an Assist & Slipper (registered trademark) mechanism. The cam surface as the Assist & Slipper (registered trademark) mechanism generates an assist torque or a slipper torque as a result of sliding against the corresponding center-side cam portion 60. Each pressure-side cam portion 90 projects to be ahead of the flange 98 in the first direction D1. As shown in FIG. 5, the pressure-side cam portions 90 are located at an equal interval in the rotation direction S of the pressure plate 70. In this example embodiment, the pressure plate 70 includes three pressure-side cam portions 90. The number of the pressure-side cam portions 90 is not limited to three.

As shown in FIG. 5, the pressure-side cam portions 90 are located ahead of the cylindrical portion 80 in the radially outward direction. The pressure-side cam portions 90 each preferably include a pressure-side assist cam surface 90A (see also FIG. 6 and FIG. 7) and a pressure-side slipper cam surface 90S. The pressure-side assist cam surface 90A is contactable with the center-side assist cam surface 60A. The pressure-side assist cam surface 90A is configured to generate a force in the direction from the pressure plate 70 toward the clutch center 40, in order to increase the pressing force (contact pressure force) between the input-side rotating plates 20 and the output-side rotating plates 22, when the pressure plate 70 rotates with respect to the clutch center 40. The pressure-side slipper cam surface 90S is contactable with the center-side slipper cam surface 60S. The pressure-side slipper cam surface 90S is configured to separate the pressure plate 70 from the clutch center 40, in order to decrease the pressing force (contact pressure force) between the input-side rotating plates 20 and the output-side rotating plates 22, when the pressure plate 70 rotates with respect to the clutch center 40. Regarding two of the pressure-side cam portions 90 adjacent to each other in the rotation direction S, the pressure-side assist cam surface 90A of one pressure-side cam portion 90L and the pressure-side slipper cam surface 90S of the other pressure-side cam portion 90M are opposed to each other in the rotation direction S.

Figure 8A:
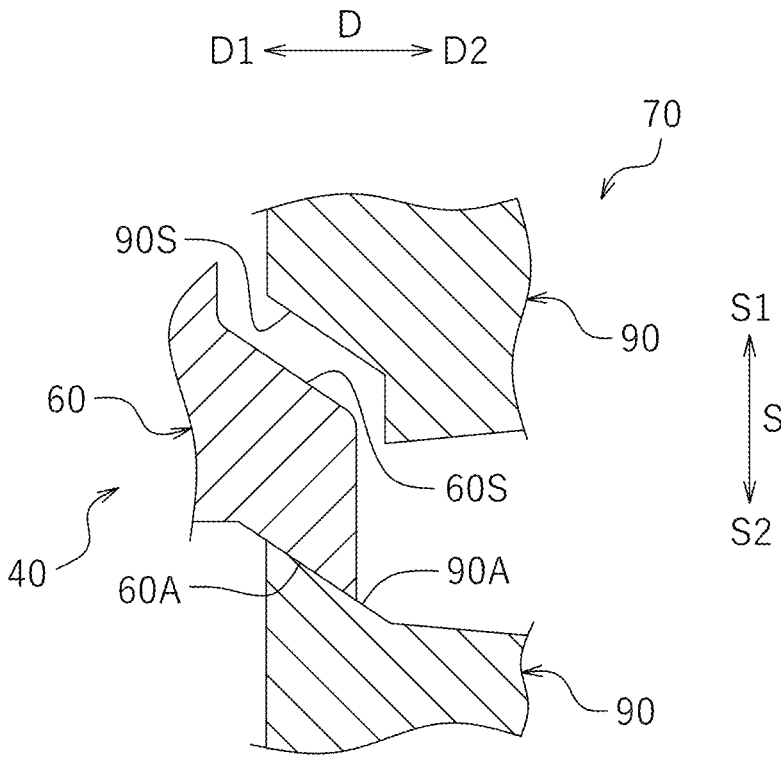
FIG. 8A is a schematic view illustrating effects of a center-side assist cam surface and a pressure-side assist cam surface.

Effects of the center-side cam portions 60 and the pressure-side cam portions 90 will now be described. Referring to FIG. 8A, when the rotation speed of the engine increases so that a rotation driving force input to the input gear 35 and the clutch housing 30 is allowed to be transferred to the output shaft 15 through the clutch center 40, a rotation force in the first rotation direction S1 is applied to the pressure plate 70. Thus, with the effects of the center-side assist cam surface 60A and the pressure-side assist cam surface 90A, a force in the first direction D1 is generated in the pressure plate 70. Accordingly, the pressure plate 70 moves further toward the clutch center 40 (in the first direction D1) to increase the contact pressure force between the input-side rotating plates 20 and the output-side rotating plates 22.

Figure 8B:
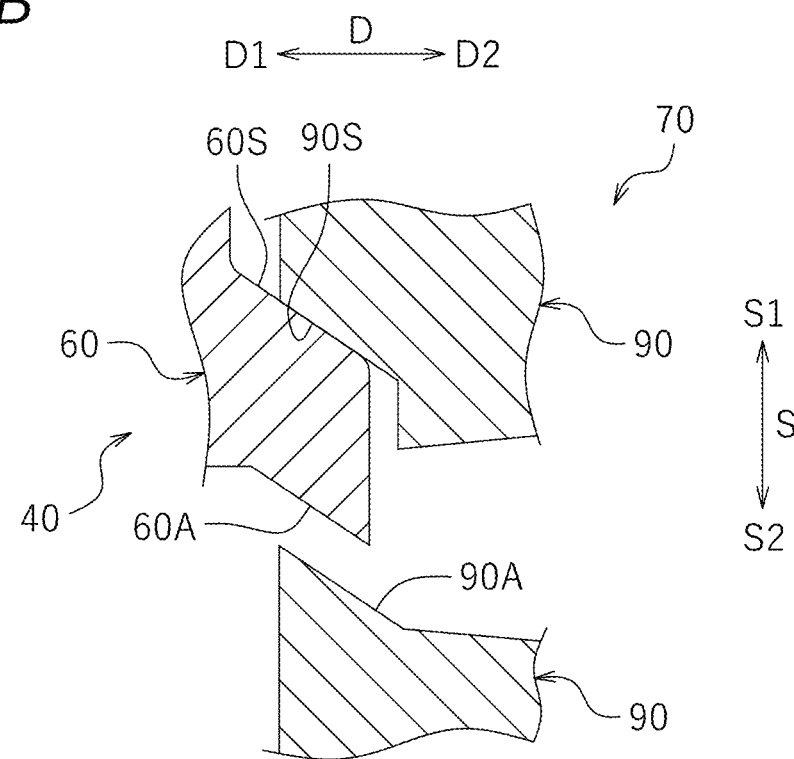
FIG. 8B is a schematic view illustrating effects of a center-side slipper cam surface and a pressure-side slipper cam surface.

By contrast, referring to FIG. 8B, when the rotation speed of the output shaft 15 exceeds the rotation speed of the input gear 35 and the clutch housing 30 and a back torque is generated, a rotation force in the first rotation direction S1 is applied to the clutch center 40. Thus, with the effects of the center-side slipper cam surface 60S and the pressure-side slipper cam surface 90S, the pressure plate 70 moves in the second direction D2 to release the input-side rotating plates 20 and the output-side rotating plates 22 from the contact pressure force. In this manner, inconveniences regarding the engine and the transmission caused by the back torque are avoided.

Figure 7:
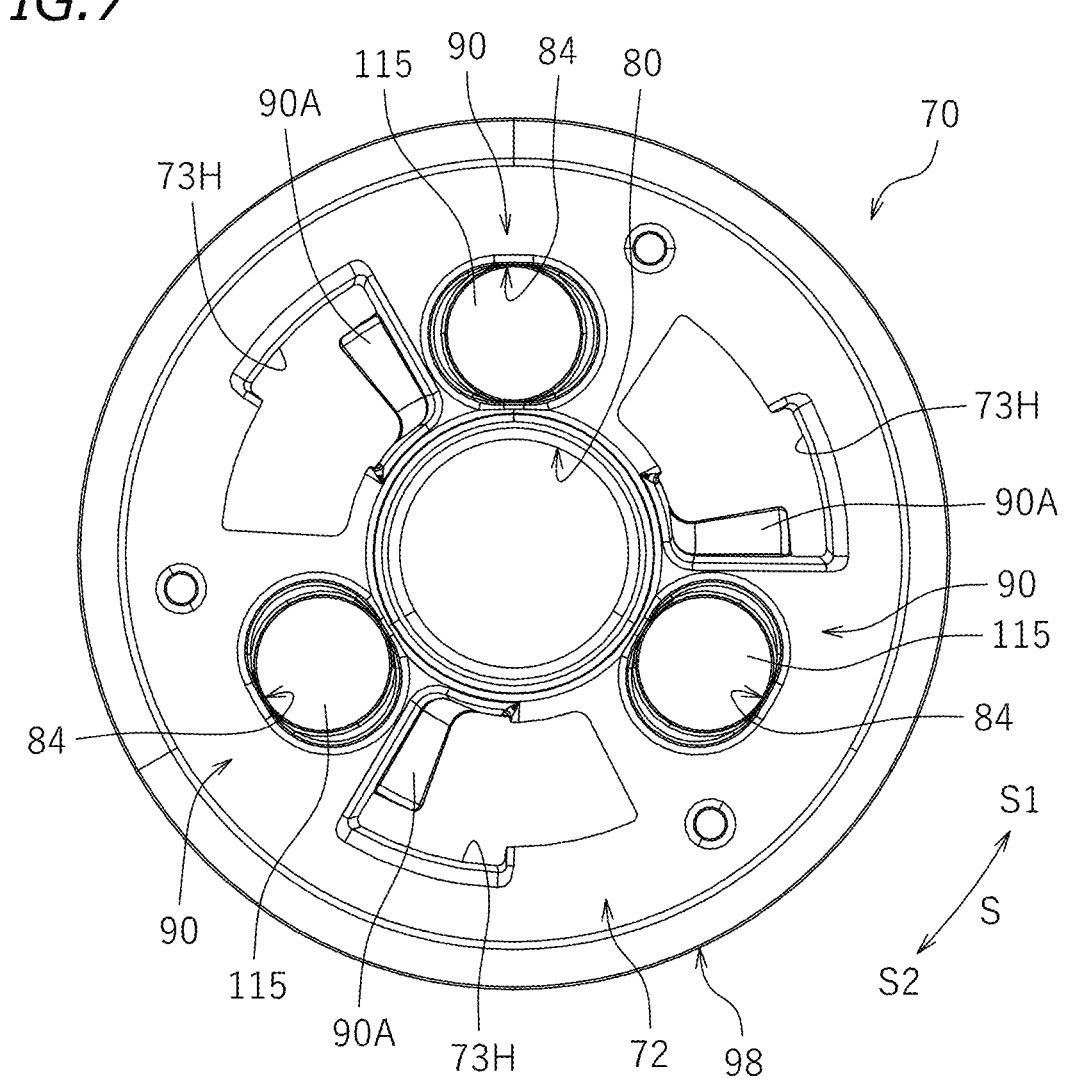
FIG. 7 is a plan view of the pressure plate according to example embodiment 1 of the present invention.

As shown in FIG. 4 and FIG. 5, the pressure plate 70 preferably includes pressure-side cam holes 73H therein, each of which penetrates a portion of the body 72. The pressure-side cam holes 73H are located ahead of the cylindrical portion 80 in the radially outward direction. The pressure-side cam holes 73H each extend from a position to the side of the cylindrical portion 80 to a position ahead of the corresponding pressure-side cam portion 90 in the radially outward direction. The pressure-side cam holes 73H are each provided between the pressure-side assist cam surface 90A of one of two adjacent pressure-side cam portions 90 and the pressure-side slipper cam surface 90S of the other of the two adjacent pressure-side cam portions 90. As shown in FIG. 5 and FIG. 7, as seen in the axial direction of the pressure plate 70, each pressure-side assist cam surface 90A and the corresponding pressure-side cam hole 73H partially overlap each other. In a state where the clutch center 40 and the pressure plate 70 are assembled together, the bosses 54 of the clutch center 40 are respectively located in the pressure-side cam holes 73H.

As shown in FIG. 4, the pressure plate 70 preferably includes a plurality of pressure-side fitting teeth 77 in an outer circumferential surface of the body 72. The pressure-side fitting teeth 77 hold at least one output-side rotating plate 22. The pressure-side fitting teeth 77 are located ahead of the flange 98 in the first direction S1. The pressure-side fitting teeth 77 are located ahead of the cylindrical portion 80 in the radially outward direction. The pressure-side fitting teeth 77 are located ahead of the pressure-side cam portions 90 in the radially outward direction. The pressure-side fitting teeth 77 are located ahead of the pressure-side cam portions 90 in the radially outward direction. The plurality of pressure-side fitting teeth 77 are arranged in the rotation direction S. The plurality of pressure-side fitting teeth 77 are located at an equal interval in the rotation direction S. In this example embodiment, a portion of the pressure-side fitting teeth 77 is removed, and therefore, the interval corresponding to such removed pressure-side fitting teeth 77 is wider than the other intervals. However, adjacent ones of the other pressure-side fitting teeth 77 are located at an equal interval.

As shown in FIG. 6 and FIG. 7, the spring housings 84 are preferably respectively provided in the pressure-side cam portions 90. The spring housings 84 are recessed in the first direction D1 from the side of the second direction D2. The spring housings 84 are elliptical as seen in the direction D (see also FIG. 9). The spring housings 84 respectively house the clutch springs 25 (see FIG. 1). The spring housings 84 are each located to the side of the corresponding pressure-side assist cam surface 90A in the rotation direction S. The expression "to the side of" does not necessarily refer to a state where the spring housing 84 and the pressure-side assist cam surface 90A are adjacent to each other. The spring housing 84 and the pressure-side assist cam surface 90A may be apart from each other in the rotation direction S, or another element (e.g., a recess or the like) integral with the pressure-side cam portion 90 may be provided between the spring housing 84 and the pressure-side assist cam surface 90A in the rotation direction S. The spring housings 84 are each located between the pressure-side assist cam surface 90A and the pressure-side slipper cam surface 90S in the rotation direction S. As shown in FIG. 1, the spring housings 84 each have a first holding groove 115 formed therein, recessed in the first direction D1 from the side of the second direction D2. The first holding groove 115 holds an end 25A described below, on the side of the first direction D1, of the clutch spring 25. The first holding groove 115 secures the end 25A on the side of the first direction D1 to the pressure plate 70. The first holding groove 115 is preferably circular as seen in the direction D. The first holding groove 115 has an inner diameter that is equal to, or shorter than, an outer diameter of the clutch spring 25. The end 25A, on the side of the first direction D1, of the clutch spring 25 is fitted into the first holding groove 115, so that the first holding groove 115 secures the end 25A on the side of the first direction D1 to the pressure plate 70. As long as the first holding groove 115 restricts the movement of the end 25A on the side of the first direction D1 with respect to the pressure plate 70 in the rotation direction S, the first holding groove 115 does not need to be circular as seen in the direction D (that is, there may be a gap between a portion of an inner circumferential surface of the first holding groove 115 and a portion of an outer circumferential surface of the clutch spring 25). The first holding groove 115 may be, for example, elliptical as seen in the direction D.

Figure 9:
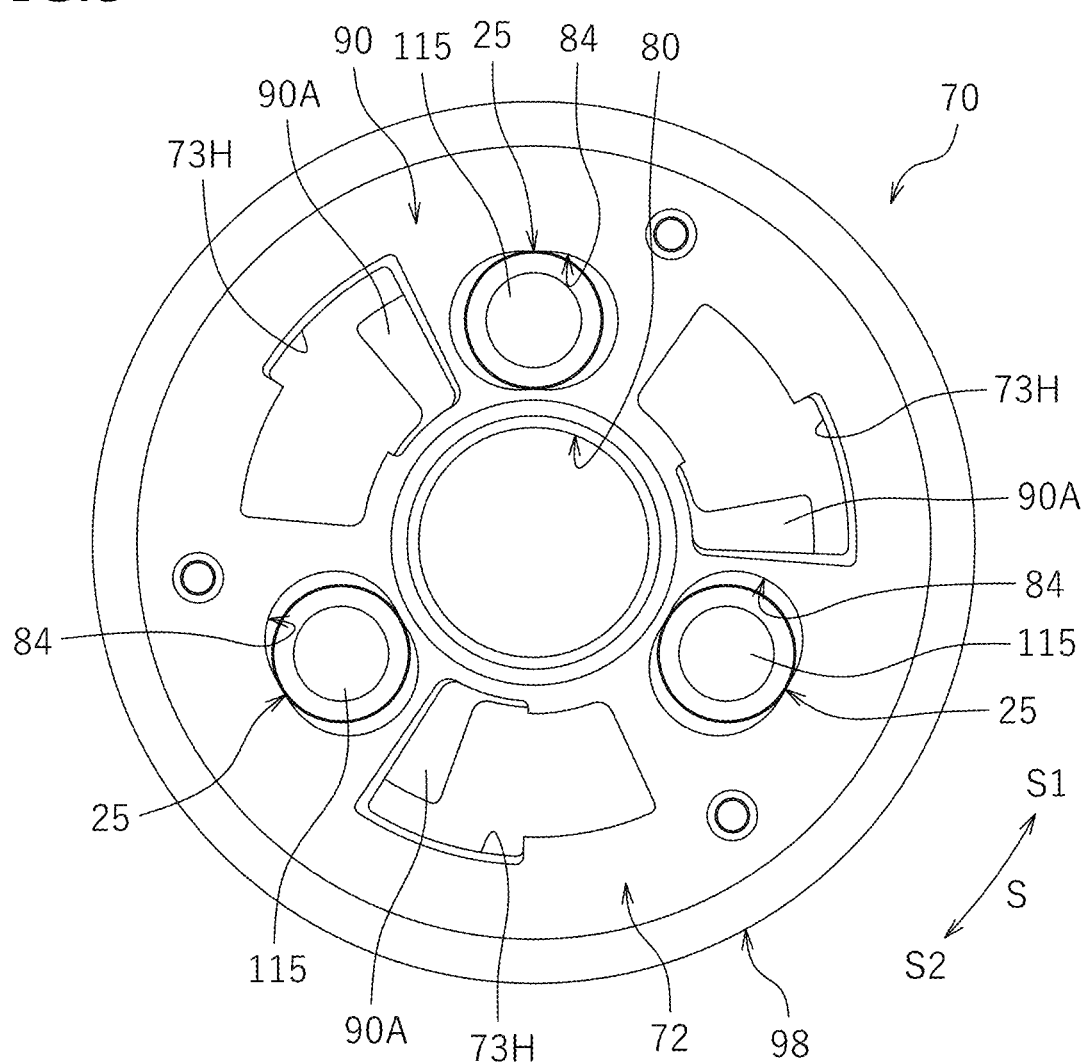
FIG. 9 is a plan view showing a state where clutch springs are housed in spring housings of the pressure plate according to example embodiment 1 of the present invention.
Figure 10A:
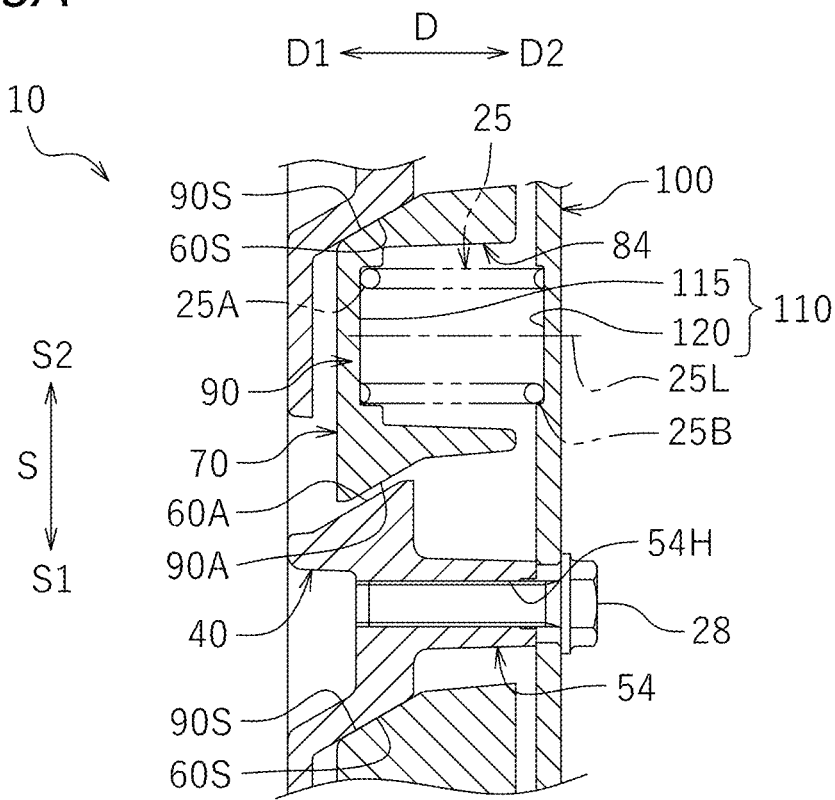
FIG. 10A is a cross-sectional view of the clutch spring in a clutch-disengaged state.
Figure 10B:
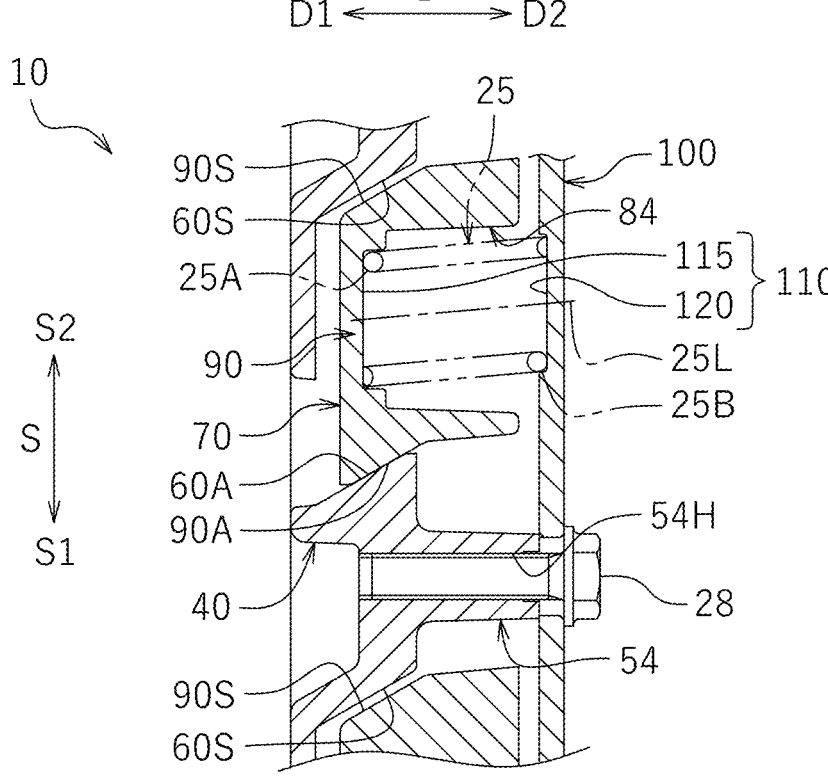
FIG. 10B is a cross-sectional view of the clutch spring in a clutch-engaged state.

As shown in FIG. 1 and FIG. 9, the clutch springs 25 are respectively housed in the spring housings 84. The clutch springs 25 urge the pressure plate 70 toward the clutch center 40. That is, the clutch springs 25 urge the pressure plate 70 in the first direction D1. The clutch springs 25 are preferably, for example, coil springs formed of helically wound spring steel. The clutch springs 25 are preferably, for example, cylindrical. The end 25A, on the side of the first direction D1, of each of the clutch springs 25 is in contact with the pressure plate 70. An end 25B, on the side of the second direction D2, of each of the clutch springs 25 is in contact with the stopper plate 100. As shown in FIGS. 10A and 10B, during the time period until the center-side assist cam surface 60A and the pressure-side assist cam surface 90A approach and contact each other (see FIG. 10B) from a state of being spaced apart from each other in the rotation direction S (see FIG. 10A), an axis 25L of the clutch spring 25 inclines in a direction from the pressure-side assist cam surface 90A toward the clutch spring 25 (i.e., in the second rotation direction S2) as extending in the second direction D2 from the side of the first direction D1 (see FIG. 10B), or is parallel to a straight line extending in the direction D, in which the pressure plate 70 moves (see FIG. 10A). According to this example embodiment, while the clutch-disengaged state (see FIG. 10A) is transferred to the clutch-engaged state (see FIG. 10B), the clutch spring 25 does not have a restoring force generated therein in a direction from the clutch spring 25 toward the pressure-side assist cam surface 90A (i.e., in the first rotation direction S1). The axis 25L of the clutch spring 25 may incline in the direction from the pressure-side assist cam surface 90A toward the clutch spring 25 (i.e., in the second rotation direction S2) as extending in the second direction D2 from the side of the first direction D1 throughout the time period of transfer from the state in FIG. 10A to the state of FIG. 10B. That is, in the example shown in FIG. 10A, the axis 25L of the clutch spring 25 is parallel to a straight line extending in the direction D in the clutch-disengaged state, but alternatively, the axis 25L of the clutch spring 25 may incline in the direction from the pressure-side assist cam surface 90A toward the clutch spring 25 (i.e., in the second rotation direction S2) as extending in the second direction D2 from the side of the first direction D1.

As shown in FIG. 1, the stopper plate 100 is provided to be contactable with the pressure plate 70. The stopper plate 100 may be provided to be contactable with a member movable in the direction D in association with the pressure plate 70. The stopper plate 100 restricts the movement of the pressure plate 70 away from the clutch center 40 in the second direction D2 by a predetermined distance or longer. The stopper plate 100 is secured to the clutch center 40. The stopper plate 100 is secured to the bosses 54 of the clutch center 40 by the bolts 28. In a state where the clutch springs 25 are housed in the spring housings 84, the stopper plate 100 is secured to the clutch center 40 by being tightened to the bosses 54 of the clutch center 40 via the bolts 28. The stopper plate 100 is preferably ring-shaped as seen in a plan view. The stopper plate 100 preferably includes second holding grooves 120 therein, each of which is recessed in the second direction D2 from the side of the first direction D1. The second holding groove 120 holds the end 25B, on the side of the second direction D2, of the clutch spring 25. The second holding groove 120 secures the end 25B on the side of the second direction D2 to the stopper plate 100. The second holding groove 120 is circular as seen in the direction D. The second holding groove 120 has an inner diameter that is equal to, or shorter than, the outer diameter of the clutch spring 25. The end 25B, on the side of the second direction D2, of the clutch spring 25 is fitted into the second holding groove 120, so that the second holding groove 120 secures the end 25B on the side of the second direction D2 to the pressure plate 70. As long as the second holding groove 120 restricts the movement of the end 25B on the side of the second direction D2 with respect to the pressure plate 70 in the rotation direction S, the second holding groove 120 does not need to be circular as seen in the direction D (that is, there may be a gap between a portion of an inner circumferential surface of the second holding groove 120 and a portion of the outer circumferential surface of the clutch spring 25). The second holding groove 120 may be, for example, elliptical as seen in the direction D.

As shown in FIG. 1, the reducers 110 in this example embodiment preferably each include the first holding groove 115 and the second holding groove 120. As shown in FIGS. 10A and 10B, during the time period until the center-side assist cam surface 60A and the pressure-side assist cam surface 90A approach and contact each other (see FIG. 10B) from a state of being spaced apart from each other in the rotation direction S (see FIG. 10A), the reducer 110 reduces the restoring force of the clutch spring 25 in the direction from the clutch spring 25 toward the pressure-side assist cam surface 90A (i.e., in the first rotation direction S1). In this example embodiment, during the time period until the center-side assist cam surface 60A and the pressure-side assist cam surface 90A approach and contact each other (see FIG. 10B) from a state of being spaced apart from each other in the rotation direction S (see FIG. 10A), the reducer 110 reduces, by the first holding groove 115 and the second holding groove 120, the restoring force of the clutch spring 25 in the direction from the clutch spring 25 toward the pressure-side assist cam surface 90A (i.e., in the first rotation direction S1).

As shown in FIGS. 10A and 10B, during the time period until the center-side assist cam surface 60A and the pressure-side assist cam surface 90A approach and contact each other (see FIG. 10B) from a state of being spaced apart from each other in the rotation direction S (see FIG. 10A), the reducer 110 suppresses (e.g., restricts and/or limits) the movement of the end 25A, on the side of the first direction D1, of the clutch spring 25 with respect to the pressure plate 70 in the rotation direction S, and the movement of the end 25B, on the side of the second direction D2, of the clutch spring 25 with respect to the stopper plate 100 in the rotation direction S. In this example embodiment, during the time period until the center-side assist cam surface 60A and the pressure-side assist cam surface 90A approach and contact each other (see FIG. 10B) from a state of being spaced apart from each other in the rotation direction S (see FIG. 10A), the reducer 110 suppresses (e.g., restricts and/or limits), by the first holding groove 115 and the second holding groove 120, the movement of the end 25A, on the side of the first direction D1, of the clutch spring 25 with respect to the pressure plate 70 in the rotation direction S, and the movement of the end 25B, on the side of the second direction D2, of the clutch spring 25 with respect to the stopper plate 100 in the rotation direction S. As long as being capable of reducing the restoring force, the reducer 110 slightly permits the movement of the end 25A on the side of the first direction D1 with respect to the pressure plate 70 in the rotation direction S, and the movement of the end 25B on the side of the second direction D2 with respect to the stopper plate 100 in the rotation direction S.

As shown in FIGS. 10A and 10B, the reducer 110 secures the end 25A, on the side of the first direction D1, of the clutch spring 25 to the pressure plate 70, and secures the end 25B, on the side of the second direction D2, of the clutch spring 25 to the stopper plate 100. In this example embodiment, the reducer 110 secures the end 25A, on the side of the first direction D1, of the clutch spring 40 to the pressure plate 70 by the first holding groove 115, and secures the end 25B, on the side of the second direction D2, of the clutch spring 25 to the stopper plate 100 by the second holding groove 120.

Now, an operation of the clutch device 10 according to this example embodiment will be described. As described above, the clutch device 10 is located between the engine and the transmission of a motorcycle, and allows or blocks transfer of a rotation driving force of the engine to the transmission by the driver making a clutch operation (e.g., making an operation on an operation lever or pressing an operation button).

In the case where the driver of the motorcycle does not make a clutch operation, a clutch release mechanism (not shown) of the clutch device 10 does not press the push rod 16A. Therefore, the pressure plate 70 presses the input-side rotating plates 20 by an urging force (elastic force) of the clutch spring 25. As a result, the input-side rotating plates 20 and the output-side rotating plates 22 are pushed to each other to realize a friction-coupled state (i.e., the clutch-engaged state), and the clutch center 40 is rotationally driven. Thus, the rotation driving force of the engine is transferred to the clutch center 40, and the output shaft 15 is rotationally driven.

By contrast, when the driver of the motorcycle makes a clutch operation in the clutch-engaged state, the clutch release mechanism (not shown) of the clutch device 10 presses the push rod 16A. Therefore, the pressure plate 70 is displaced away from the clutch center 40 (in the second direction D2) against the urging force of the clutch spring 25. As a result, the input-side rotating plates 20 and the output-side rotating plates 22 are released from the friction-coupled state (i.e., the clutch-disengaged state) in the clutch center 40, and therefore, the rotational driving of the output shaft 15 is attenuated or paused. This blocks the transfer of the rotation driving force of the engine to the clutch center 40. During the time period in which the clutch-engaged state (see FIG. 10B) is transferred to the clutch-disengaged state (see FIG. 10A), the reducer 110 reduces the restoring force of the clutch spring 25 in the direction from the clutch spring 25 toward the pressure-side assist cam surface 90A (i.e., in the first rotation direction S1). In this example embodiment, the above-mentioned restoring force is not generated in the clutch spring 25.

When the driver cancels the clutch operation (e.g., the driver cancels the operation on the operation lever or release the operation button from the pressed state) in the clutch-disengaged state (see FIG. 10A), the pressure plate 70 is released from the pressing state realized via the pusher 16B by the clutch release mechanism (not shown). Therefore, the pressure plate 70 is displaced toward the clutch center 40 (in the first direction D1) by the urging force of the clutch spring 25. During the time period in which the clutch-disengaged state (see FIG. 10A) is transferred to the clutch-engaged state (see FIG. 10B), the reducer 110 reduces the restoring force of the clutch spring 25 in the direction from the clutch spring 25 toward the pressure-side assist cam surface 90A (i.e., in the first rotation direction S1). In this example embodiment, the restoring force is not generated in the clutch spring 25. Therefore, rapid contact of the center-side assist cam surface 60A and the pressure-side assist cam surface 90A by the restoring force is prevented.

As described above, according to the clutch device 10 in this example embodiment, during the time period until the center-side assist cam surface 60A and the pressure-side assist cam surface 90A approach and contact each other from a state of being spaced apart from each other in the rotation direction S, the reducer 110 reduces the restoring force of the clutch spring 25 in the direction from the clutch spring 25 toward the pressure-side assist surface 90A (i.e., in the first rotation direction S1). In this manner, the restoring force that may be generated in the clutch spring 25 is reduced by the reducer 110. Therefore, rapid contact of the center-side assist cam surface 60A and the pressure-side assist cam surface 90A by the restoring force is prevented. That is, the reducer 110 suppresses or restricts rapid clutch engagement.

According to the clutch device 10 in this example embodiment, during the time period until the center-side assist cam surface 60A and the pressure-side assist cam surface 90A approach and contact each other from a state of being spaced apart from each other in the rotation direction S, the reducer 110 restricts the movement of the end 25A, on the side of the first direction D1, of the clutch spring 25 with respect to the pressure plate 70 in the rotation direction S, and the movement of the end 25B, on the side of the second direction D2, of the clutch spring 25 with respect to the stopper plate 100 in the rotation direction S. During the time period until the center-side assist cam surface 60A and the pressure-side assist cam surface 90A approach and contact each other from a state of being spaced apart from each other in the rotation direction S, the axis 25L of the clutch spring 25 inclines in the direction from the pressure-side assist cam surface 90A toward the clutch spring 25 (i.e., in the second rotation direction S2) as extending in the second direction D2 from the side of the first direction D1, or is parallel to a straight line in the direction D, in which the pressure plate 70 moves. According to this example embodiment, the restoring force in the direction from the clutch spring 25 toward the pressure-side assist cam surface 90A is not generated in the clutch spring 25.

According to the clutch device 10 in this example embodiment, the reducer 110 secures the end 25A, on the side of the first direction D1, of the clutch spring 25 to the pressure plate 70, and secures the end 25B, on the side of the second direction D2, of the clutch spring 25 to the stopper plate 100. According to this example embodiment, the movement of the clutch spring 25 with respect to each of the pressure plate 70 and the stopper plate 100 is prevented with more certainty. As a result, the restoring force in the direction from the clutch spring 25 toward the pressure-side assist cam surface 90A is not generated in the clutch spring 25.

According to the clutch device in this example embodiment, the reducer 110 preferably includes the first holding groove 115 in the pressure plate 70, recessed in the first direction D1 from the side of the second direction D2, and holding the end D1, on the side of the first direction D1, of the clutch spring 25, and also includes the second holding groove 120 defined in the stopper plate 100, recessed in the second direction D2 from the side of the first direction D1, and holding the end 25B, on the side of the second direction D2, of the clutch spring 25. According to this example embodiment, the clutch spring 25 is able to be secured to the pressure plate 70 and the stopper plate 100 more easily.

Figure 11A:
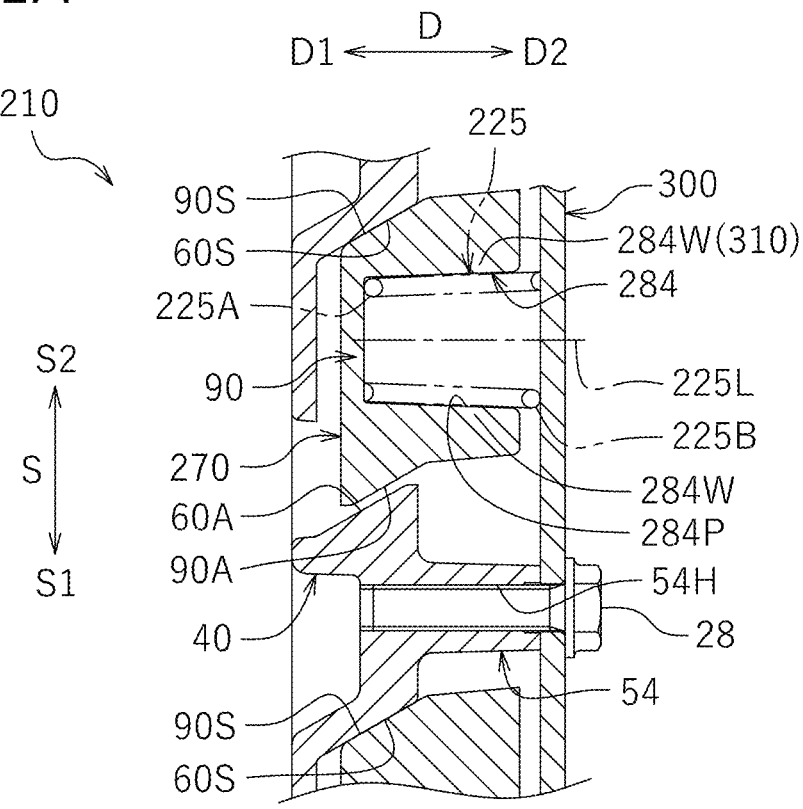
FIG. 11A is a cross-sectional view of a clutch spring in a clutch-disengaged state in example embodiment 2 of the present invention.
Figure 11B:
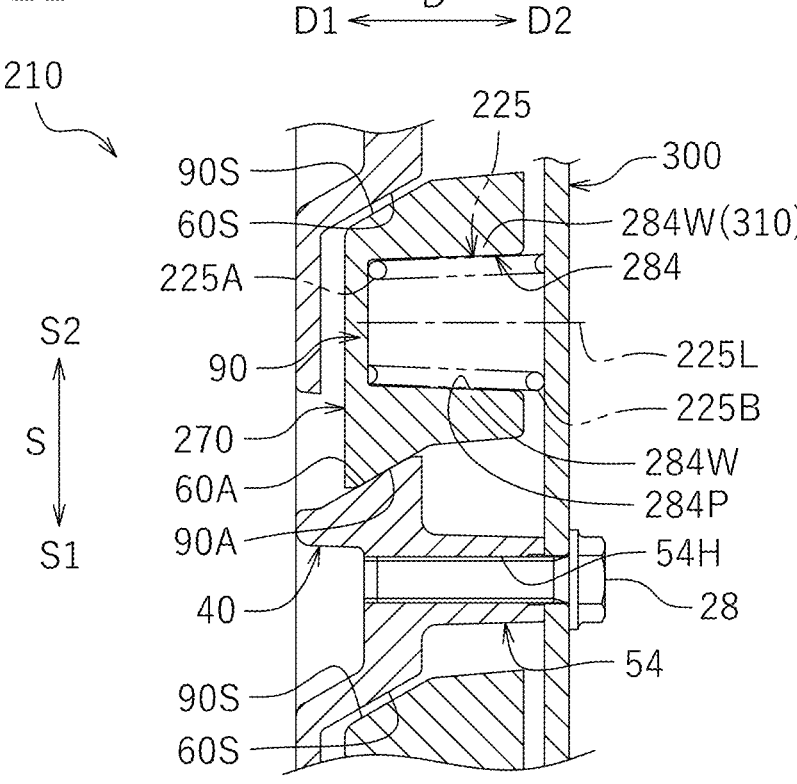
FIG. 11B is a cross-sectional view of the clutch spring in a clutch-engaged state in example embodiment 2 of the present invention.

FIGS. 11A and 11B are each a cross-sectional view showing a portion of a clutch device 210 according to example embodiment 2. The clutch device 210 preferably includes the output shaft 15, the input-side rotating plates 20, the output-side rotating plates 22, the clutch housing 30, the clutch center 40, a pressure plate 270, a stopper plate 300, clutch springs 225, and reducers 310.

Figure 12:
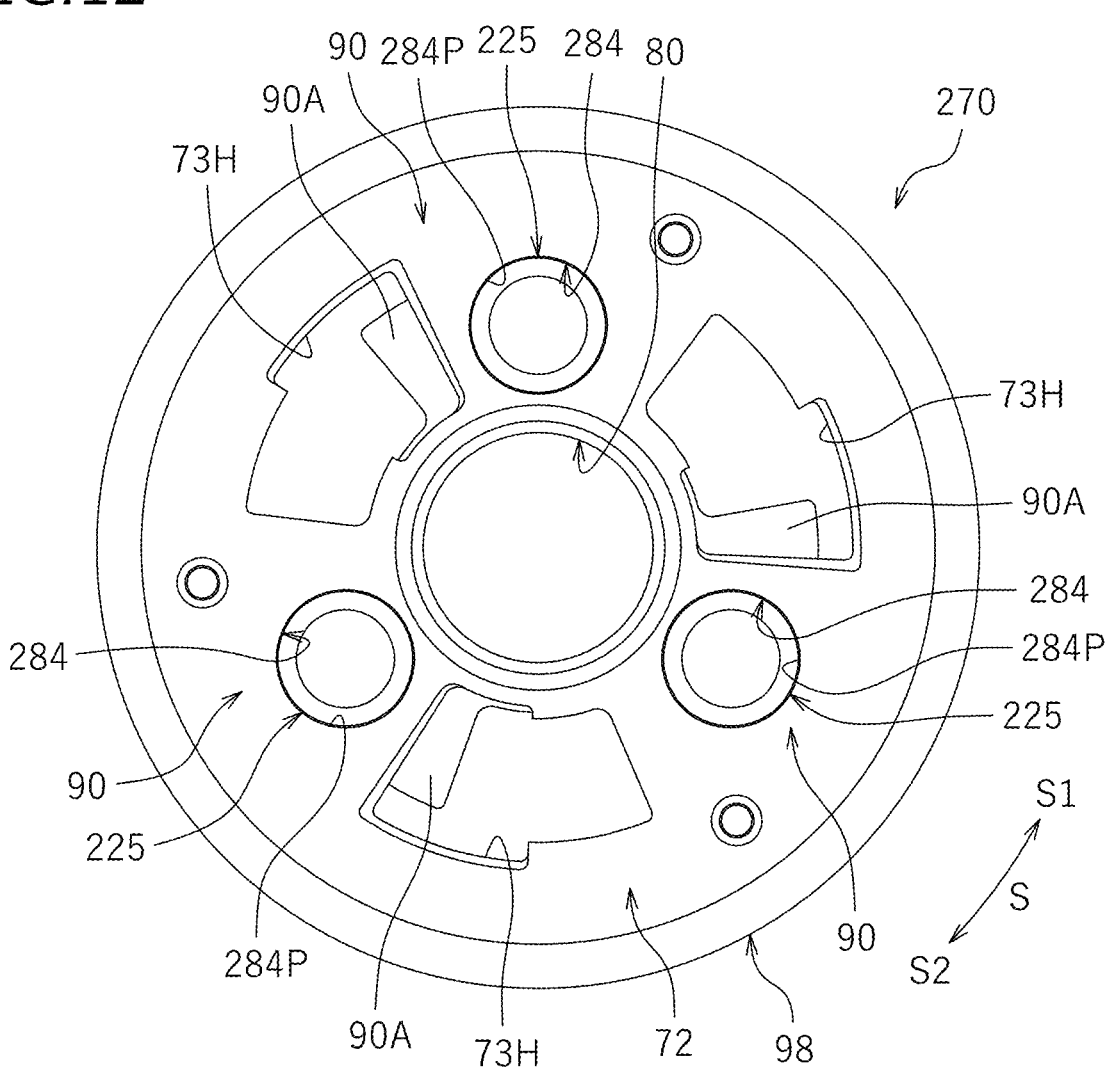
FIG. 12 is a plan view showing a state where the clutch springs are housed in spring housings of a pressure plate according to example embodiment 2 of the present invention.

As shown in FIG. 11A and FIG. 12, the pressure plate 270 includes spring housings 284 respectively housing the clutch springs 225. The spring housings 284 are each an example of housing portion. The spring housings 284 are respectively provided in the pressure-side cam portions 90. The spring housings 284 are recessed in the first direction D1 from the side of the second direction D2. The spring housings 284 are each preferably defined by a partition wall 284W. The spring housings 284 are circular as seen in the direction D (see also FIG. 12). The spring housings 284 each preferably have an inner diameter that is increased in the second direction D2 from the side of the first direction D1. The spring housings 284 are each located to the side of the corresponding pressure-side assist cam surface 90A in the rotation direction S. The expression "to the side of" does not necessarily refer to a state where the spring housing 284 and the pressure-side assist cam surface 90A are adjacent to each other. The spring housing 284 and the pressure-side assist cam surface 90A may be spaced apart from each other in the rotation direction S, or another element (e.g., a recess or the like) integral with the pressure-side cam portion 90 may be provided between the spring housing 284 and the pressure-side assist cam surface 90A in the rotation direction S. The spring housings 284 are each located between the pressure-side assist cam surface 90A and the pressure-side slipper cam surface 90S in the rotation direction S.

As shown in FIG. 11A and FIG. 12, the clutch springs 225 are respectively housed in the spring housings 284. The clutch springs 225 are each in contact with an inner circumferential surface 284P of the partition wall 284W in the entirety of the partition wall 284W (i.e., in the entirety of the partition wall 284W in the direction D). The clutch springs 225 are preferably, for example, conical springs formed of helically wound spring steel. The clutch springs 225 each preferably have, for example, a truncated cone shape having an outer diameter that is increased in the second direction D2 from the side of the first direction D1. The clutch springs 225 urge the pressure plate 70 toward the clutch center 40. That is, the clutch springs 225 urge the pressure plate 70 in the first direction D1. An end 225A, on the side of the first direction D1, of each of the clutch springs 225 is in contact with the pressure plate 70. The end 225A on the side of the first direction D1 is provided not to be slidable with respect to the pressure plate 70. An end 225B, on the side of the second direction D2, of each of the clutch springs 225 is in contact with the stopper plate 100. The end 225B on the side of the second direction D2 is provided to be slidable with respect to the stopper plate 100. As shown in FIG. 11A and FIG. 11B, during the time period until the center-side assist cam surface 60A and the pressure-side assist cam surface 90A approach and contact each other (see FIG. 11B) from a state of being spaced apart from each other in the rotation direction S (see FIG. 11A), an axis 225L of the clutch spring 225 is parallel to a straight line extending in the direction D, in which the pressure plate 270 moves. That is, the clutch spring 225 does not incline. According to this example embodiment, a restoring force in a direction from the clutch spring 225 toward the pressure-side assist cam surface 90A (i.e., in the first rotation direction S1) is not generated in the clutch spring 225. FIG. 11A shows a clutch-disengaged state, and FIG. 11B shows a clutch-engaged state. As shown in FIG. 11A, the stopper plate 300 preferably has substantially the same configuration as that of the stopper plate 100 except that the stopper plate 300 does not have the second holding grooves 120 formed therein (see FIG. 10A).

As shown in FIG. 11A, the reducers 310 in this example embodiment are each the partition wall 284W defining the spring housing 284. As shown in FIGS. 11A and 11B, during the time period until the center-side assist cam surface 60A and the pressure-side assist cam surface 90A approach and contact each other (see FIG. 11B) from a state of being spaced apart from each other in the rotation direction S (see FIG. 11A), the reducer 310 reduces the restoring force of the clutch spring 225 in the direction from the clutch spring 225 toward the pressure-side assist cam surface 90A (i.e., in the first rotation direction S1). In this example embodiment, during the time period until the center-side assist cam surface 60A and the pressure-side assist cam surface 90A approach and contact each other (see FIG. 11B) from a state of being spaced apart from each other in the rotation direction S (see FIG. 11A), the reducer 310 restricts the inclination of the clutch spring 225, housed in the clutch housing 284, in the rotation direction S. In this example embodiment, during the time period until the center-side assist cam surface 60A and the pressure-side assist cam surface 90A approach and contact each other (see FIG. 11B) from a state of being spaced apart from each other in the rotation direction S (see FIG. 11A), the clutch spring 225 is in contact with the inner circumferential surface 284P of the partition wall 284W in the entirety of the partition wall 284W (i.e., in the entirety of the partition wall 284W in the direction D). Therefore, the clutch spring 225 does not incline, and the restoring force in the direction from the clutch spring 225 toward the pressure-side assist cam surface 90A (i.e., in the first rotation direction S1) is not generated in the clutch spring 225.

According to the clutch in this example embodiment, during the time period until the center-side assist cam surface 60A and the pressure-side assist cam surface 90A approach and contact each other from a state of being spaced apart from each other in the rotation direction S, the reducer 310 resists the inclination of the clutch spring 225, housed in the clutch housing 284, in the rotation direction S. According to this example embodiment, the inclination of the clutch spring 225 in the rotation direction S is prevented by the reducer 310, and therefore, the restoring force in the direction from the clutch spring 225 toward the pressure-side assist cam surface 90A is not generated in the clutch spring 225.

According to the clutch device 210 this example embodiment, the reducer 310 is the partition wall 284W defining the clutch housing 284. The clutch spring 225 is in contact with the inner circumferential surface 284P of the partition wall 284W in the entirety of the partition wall 284W. According to this example embodiment, the clutch spring 225 does not incline in the rotation direction S. Therefore, the restoring force in the direction from the clutch spring 225 toward the pressure-side assist cam surface 90A is not generated in the clutch spring 225.

According to the clutch device 210 in this example embodiment, the spring housing 284 preferably has an inner diameter that is increased in the second direction D2 from the side of the first direction D1. The clutch spring 225 preferably has a truncated cone shape. According to this example embodiment, the clutch spring 225 does not incline in the rotation direction S. Therefore, the restoring force in the direction from the clutch spring 225 toward the pressure-side assist cam surface 90A is not generated in the clutch spring 225.

Figure 13:
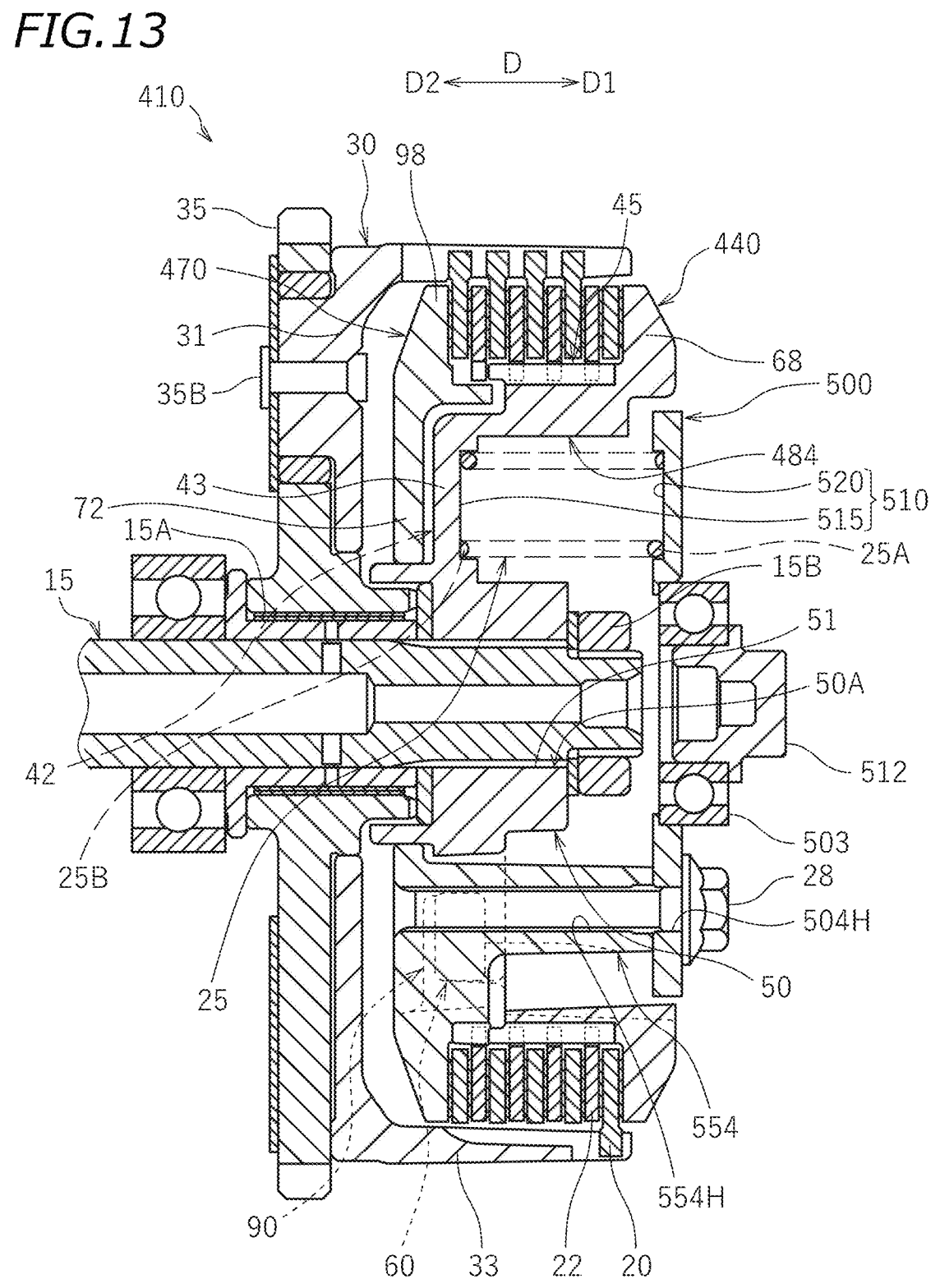

FIG. 13 is a cross-sectional view of a clutch device 410 according to example embodiment 3. As shown in FIG. 13, the clutch device 410 preferably includes the output shaft 15, the input-side rotating plates 20, the output-side rotating plates 22, the clutch housing 30, a clutch center 440, a pressure plate 470, a lifter plate 500, the clutch springs 25, and reducers 510. The clutch device 410 is preferably a so-called push-type clutch device.

As shown in FIG. 13, the side wall 33 of the clutch housing 30 extends in the first direction D1 from the edge of the bottom wall 31.

Figure 14A:
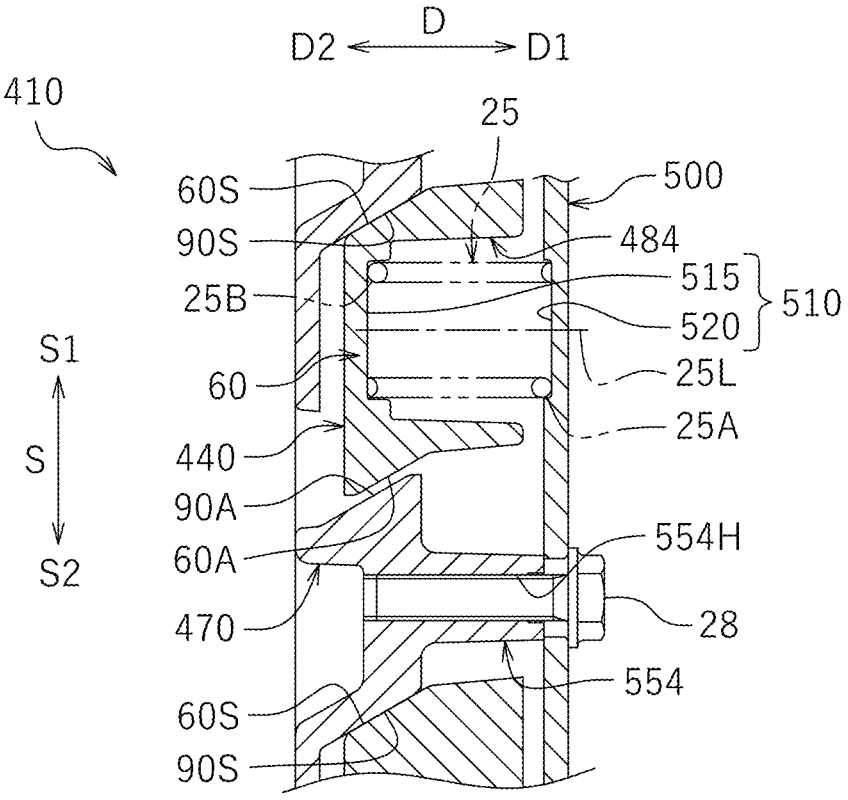
FIG. 14A is a cross-sectional view of a clutch spring in a clutch-disengaged state.
Figure 14B:
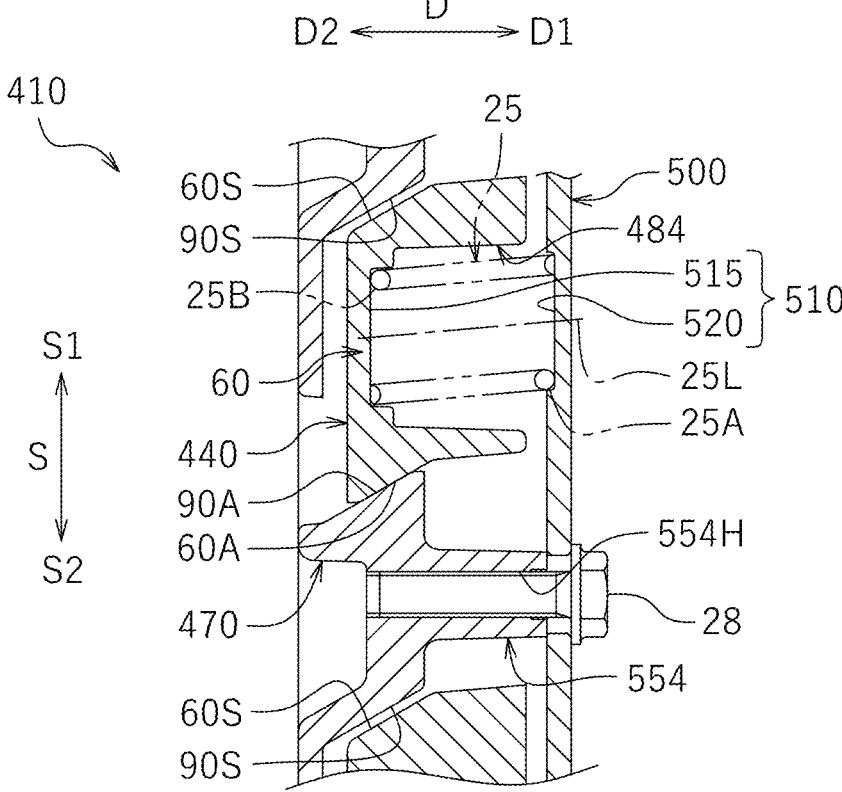
FIG. 14B is a cross-sectional view of the clutch spring in a clutch-engaged state.

As shown in FIG. 13, the pressure plate 470 includes a plurality of (in this example embodiment, three) bosses 554. The bosses 554 support the lifter plate 500. The plurality of bosses 554 are located at an equal interval in the rotation direction S. The bosses 554 are cylindrical. The bosses 554 extend toward the clutch center 440 (i.e., in the first direction D1). The bosses 554 are respectively provided in the pressure-side cam portions 90. As shown in FIGS. 14A and 14B, the bosses 554 are each preferably located between the pressure-side assist cam surface 90A and the pressure-side slipper cam surface 90S in the rotation direction S. The bosses 554 each preferably include a screw hole 554H therein. The screw hole 554H extends in the axial direction of the pressure plate 470. The bolts 28 (see FIG. 13) usable to secure the lifter plate 500 to the pressure plate 470 are respectively inserted into the screw holes 554H.

As shown in FIG. 13, the clutch center 440 includes spring housings 484. The spring housings 484 are each an example of housing portion. The spring housings 484 are preferably defined in the body 42. The spring housings 484 are respectively included in the center-side cam portions 60. The spring housings 484 are recessed in the second direction D2 from the side of the first direction D1. The spring housings 484 are elliptical as seen in the direction D. The spring housings 484 respectively house the clutch springs 25. As shown in FIGS. 14A and 14B, the spring housings 484 are each located to the side of the corresponding center-side assist cam surface 60A in the rotation direction S. The expression "to the side of" does not necessarily refer to a state where the spring housing 484 and the center-side assist cam surface 60A are adjacent to each other. The spring housing 484 and the center-side assist cam surface 60A may be apart from each other in the rotation direction S, or another element (e.g., a recess or the like) integral with the center-side cam portion 60 may be provided between the spring housing 484 and the center-side assist cam surface 60A in the rotation direction S. The spring housings 484 are each located between the center-side assist cam surface 60A and the center-side slipper cam surface 60S in the rotation direction S. The spring housings 84 each preferably include a first holding groove 515 defined therein, recessed in the second direction D2 from the side of the first direction D1. The first holding groove 515 holds the end 25B, on the side of the second direction D2, of the clutch spring 25. The first holding groove 515 secures the end 25B on the side of the second direction D2 to the clutch center 440. The first holding groove 515 preferably includes the same or substantially the same configuration as that of the first holding groove 115.

As shown in FIG. 13, the clutch springs 25 are respectively housed in the clutch housings 484. The end 25B, on the side of the second direction D2, of each of the clutch springs 25 is in contact with the clutch center 440. The end 25A, on the side of the first direction D1, of each of the clutch springs 25 is in contact with the lifter plate 500. As shown in FIGS. 14A and 14B, during the time period until the center-side assist cam surface 60A and the pressure-side assist cam surface 90A approach and contact each other (see FIG. 14B) from a state of being spaced apart from each other in the rotation direction S (see FIG. 14A), the axis 25L of the clutch spring 25 inclines in a direction from the center-side assist cam surface 60A toward the clutch spring 25 (i.e., in the first rotation direction S1) as extending in the first direction D1 from the side of the second direction D2 (see FIG. 14B), or is parallel to a straight line extending in the direction D, in which the pressure plate 470 moves (see FIG. 14A). According to this example embodiment, while a clutch-disengaged state (see FIG. 14A) is transferred to a clutch-engaged state (see FIG. 14B), the clutch spring 25 does not have a restoring force generated therein in a direction from the clutch spring 25 toward the center-side assist cam surface 60A (i.e., in the second rotation direction S2). The axis 25L of the clutch spring 25 may incline in the direction from the center-side assist cam surface 60A toward the clutch spring 25 (i.e., in the first rotation direction S1) as extending in the first direction D1 from the side of the second direction D2 throughout the time period of transfer from the state in FIG. 14A to the state of FIG. 14B.

As shown in FIG. 13, the lifter plate 500 is contactable with the clutch center 40. The lifter plate 500 may be provided to be contactable with a structure rotatable in association with the clutch center 400. The lifter plate 500 displaces the pressure plate 470 in the direction D. The lifter plate 500 restricts the movement of the pressure plate 470 away from the clutch center 440 in the second direction D2 by a predetermined distance or longer. The lifter plate 500 is secured to the pressure plate 470. The lifter plate 500 is secured to the bosses 554 of the pressure plate 470 by the bolts 28. The lifter plate 500 is integrally rotatable with the pressure plate 470. The lifter plate 500 is movable with respect to the clutch center 440 in the direction D and also is rotatable with respect to the clutch center 440. The lifter plate 500 is disc-shaped. A release bearing 503 is provided in the lifter plate 500. The release bearing 503 is pressed to a release fork 512 of a clutch release mechanism (not shown). The "clutch release mechanism" refers to a mechanical device that is provided in a vehicle such as a motorcycle having the clutch device 410 mounted thereon and that presses the release bearing 503 toward the output shaft 15 (i.e., in the second direction D2) via the release fork 512 by an operation made by the driver on the clutch operation lever (not shown). The lifter plate 500 supports the clutch springs 25 housed in the spring housings 484 of the clutch center 440. The lifter plate 500 has insertion holes 504H formed therein, into which the bolts 28 usable to secure the lifter plate 500 to the pressure plate 470 are inserted. The lifter plate 500 has second holding grooves 520 formed therein, each recessed in the first direction D1 from the side of the second direction D2. The second holding groove 520 holds the end 25A, on the side of the first direction D1, of the clutch spring 25. The second holding groove 520 secures the end 25A on the side of the first direction D1 to the lifter plate 500. The second holding groove 520 has substantially the same configuration as that of the second holding groove 120.

As shown in FIG. 13, the reducers 510 in this example embodiment each include the first holding groove 515 and the second holding groove 520. As shown in FIGS. 14A and 14B, during the time period until the center-side assist cam surface 60A and the pressure-side assist cam surface 90A approach and contact each other (see FIG. 14B) from a state of being spaced apart from each other in the rotation direction S (see FIG. 14A), the reducer 510 reduces the restoring force of the clutch spring 25 in the direction from the clutch spring 25 toward the center-side assist cam surface 60A (i.e., in the second rotation direction S2). In this example embodiment, during the time period until the center-side assist cam surface 60A and the pressure-side assist cam surface 90A approach and contact each other (see FIG. 14B) from a state of being spaced apart from each other in the rotation direction S (see FIG. 14A), the reducer 510 reduces, by the first holding groove 515 and the second holding groove 520, the restoring force of the clutch spring 25 in the direction from the clutch spring 25 toward the center-side assist cam surface 60A (i.e., in the second rotation direction S2).

As shown in FIGS. 14A and 14B, during the time period until the center-side assist cam surface 60A and the pressure-side assist cam surface 90A approach and contact each other (see FIG. 14B) from a state of being spaced apart from each other in the rotation direction S (see FIG. 14A), the reducer 510 restricts the movement of the end 25B, on the side of the second direction D2, of the clutch spring 25 with respect to the clutch center 440 in the rotation direction S, and the movement of the end 25A, on the side of the first direction D1, of the clutch spring 25 with respect to the lifter plate 500 in the rotation direction S. In this example embodiment, during the time period until the center-side assist cam surface 60A and the pressure-side assist cam surface 90A approach and contact each other (see FIG. 14B) from a state of being spaced apart from each other in the rotation direction s (see (FIG. 14A), the reducer 510 restricts, through the first holding groove 515 and the second holding groove 520, the movement of the end 25B, on the side of the second direction D2, of the clutch spring 25 with respect to the clutch center 440 in the rotation direction S, and the movement of the end 25A, on the side of the first direction D1, of the clutch spring 25 with respect to the lifter plate 500 in the rotation direction S. As long as being capable of reducing the restoring force, the reducer 510 slightly permits the movement of the end 25B on the side of the second direction D2 with respect to the clutch center 440 in the rotation direction S, and the movement of the end 25A on the side of the first direction D1 with respect to the lifter plate 500 in the rotation direction S.

As shown in FIGS. 14A and 14B, the reducer 510 secures the end 25B, on the side of the second direction D2, of the clutch spring 25 to the clutch center 440, and secures the end 25A, on the side of the first direction D1, of the clutch spring 25 to the lifter plate 500. In this example embodiment, the reducer 510 secures the end 25B, on the side of the second direction D2, of the clutch spring 40 to the clutch center 440 by the first holding groove 515, and secures the end 25A, on the side of the first direction D1, of the clutch spring 25 to the lifter plate 500 by the second holding groove 520.

As described above, according to the clutch device 410 in this example embodiment, during the time period until the center-side assist cam surface 60A and the pressure-side assist cam surface 90A approach and contact each other from a state of being spaced apart from each other in the rotation direction S, the reducer 510 reduces the restoring force of the clutch spring 25 in the direction from the clutch spring 25 toward the center-side assist cam surface 60A (i.e., in the second rotation direction S2). In this manner, the restoring force that may be generated in the clutch spring 25 is reduced by the reducer 510. Therefore, rapid contact of the center-side assist cam surface 60A and the pressure-side assist cam surface 90A by the restoring force is prevented. That is, the reducer 510 suppresses or limits rapid clutch engagement.

According to the clutch device 410 in this example embodiment, during the time period until the center-side assist cam surface 60A and the pressure-side assist cam surface 90A approach and contact each other from a state of being spaced apart from each other in the rotation direction S, the reducer 510 restricts the movement of the end 25B, on the side of the second direction D2, of the clutch spring 25 with respect to the clutch center 440 in the rotation direction S, and the movement of the end 25A, on the side of the first direction D1, of the clutch spring 25 with respect to the lifter plate 500 in the rotation direction S. During the time period until the center-side assist cam surface 60A and the pressure-side assist cam surface 90A approach and contact each other from a state of being spaced apart from each other in the rotation direction S, the axis 25L of the clutch spring 25 inclines in the direction from the center-side assist cam surface 60A toward the clutch spring 25 (i.e., in the first rotation direction S1) as extending in the first direction D1 from the side of the second direction D2, or is parallel to a straight line extending in the direction D, in which the pressure plate 70 moves. According to this example embodiment, the restoring force in the direction from the clutch spring 25 toward the center-side assist cam surface 60A is not generated in the clutch spring 25.

Figure 15A:
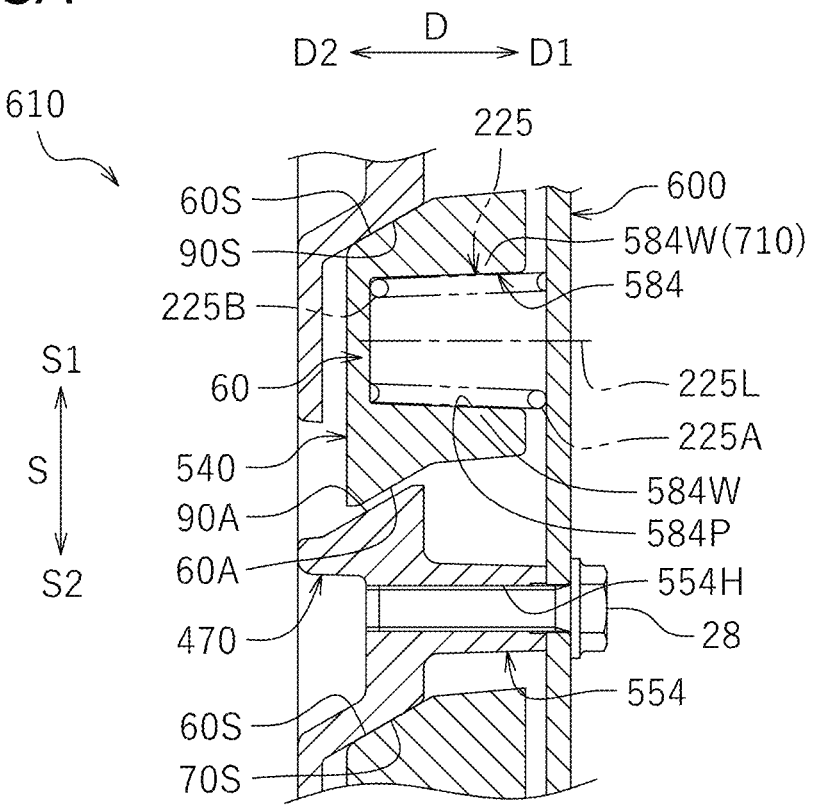
FIG. 15A is a cross-sectional view of a clutch spring in a clutch-disengaged state in example embodiment 4 of the present invention.
Figure 15B:
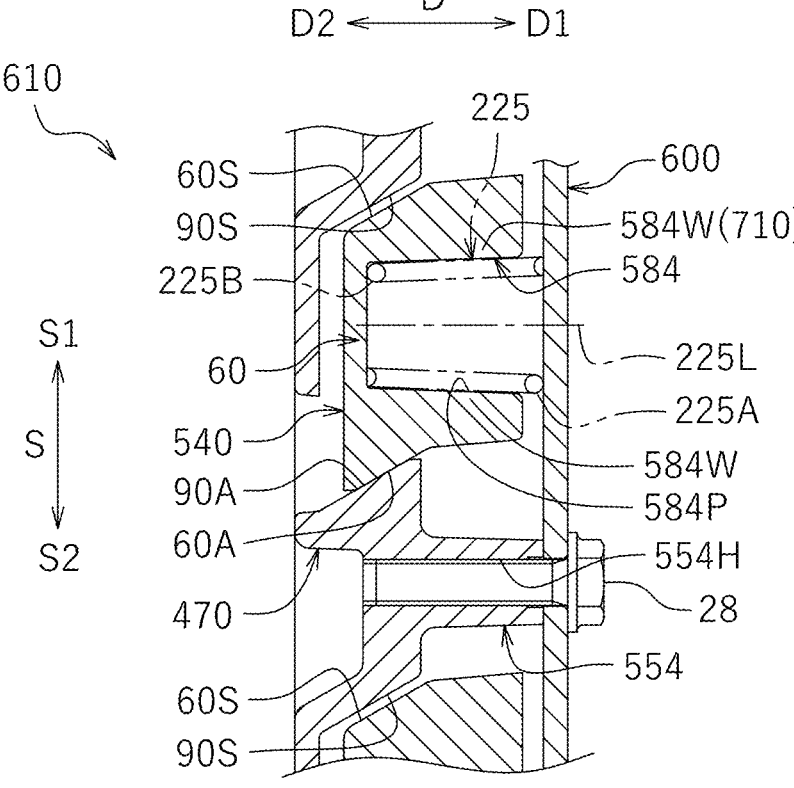
FIG. 15B is a cross-sectional view of the clutch spring in a clutch-engaged state in example embodiment 4 of the present invention.

FIGS. 15A and 15B are each a cross-sectional view showing a portion of a clutch device 610 according to example embodiment 4. The clutch device 610 preferably includes the output shaft 15, the input-side rotating plates 20, the output-side rotating plates 22, the clutch housing 30, a clutch center 540, the pressure plate 470, a lifter plate 600, the clutch springs 225, and reducers 710.

As shown in FIGS. 15A and 15B, the clutch center 540 includes spring housings 584 respectively housing the clutch springs 225. The spring housings 584 are each an example of housing portion. The spring housings 584 are respectively provided in the center-side cam portions 60. The spring housings 584 are recessed in the second direction D2 from the side of the first direction D1. The spring housings 584 are each defined by a partition wall 584W. The spring housings 584 are preferably circular as seen in the direction D. The spring housings 584 each preferably have an inner diameter that is increased in the first direction D1 from the side of the second direction D2. The spring housings 584 are each located to the side of the corresponding center-side assist cam surface 60A in the rotation direction S. The expression "to the side of" does not necessarily refer to a state where the spring housing 584 and the center-side assist cam surface 60A are adjacent to each other. The spring housing 584 and the center-side assist cam surface 60A may be apart from each other in the rotation direction S, or another element (e.g., a recess or the like) integral with the center-side cam portion 60 may be provided between the spring housing 584 and the center-side assist cam surface 60A in the rotation direction S. The spring housing 584 are each located between the center-side assist cam surface 60A and the center-side slipper cam surface 60S in the rotation direction S.

As shown in FIGS. 15A and 15B, the clutch springs 225 are respectively housed in the spring housings 584. The clutch springs 225 are each in contact with an inner circumferential surface 584P of the partition wall 584W in the entirety of the partition wall 584W (i.e., in the entirety of the partition wall 584W in the direction D). The clutch springs 225 urge the pressure plate 470 toward the clutch center 540. That is, the clutch springs 225 urge the pressure plate 470 in the first direction D1. An end 225B, on the side of the second direction D2, of each of the clutch springs 225 is in contact with the clutch center 540. The end 225B on the side of the second direction D2 is provided not to be slidable with respect to the clutch center 540. An end 225A, on the side of the first direction D1, of each of the clutch springs 225 is in contact with the lifter plate 600. The end 225A on the side of the first direction D1 is provided to be slidable with respect to the lifter plate 600. During the time period until the center-side assist cam surface 60A and the pressure-side assist cam surface 90A approach and contact each other (see FIG. 15B) from a state of being spaced apart from each other in the rotation direction S (see FIG. 15A), the axis 225L of the clutch spring 225 is parallel to a straight line extending in the direction D, in which the pressure plate 270 moves. That is, the clutch spring 225 does not incline. According to this example embodiment, the clutch spring 225 does not have a restoring force generated therein in a direction from the clutch spring 225 toward the center-side assist cam surface 60A (i.e., in the second rotation direction S2). FIG. 15A shows a clutch-disengaged state, and FIG. 15B shows a clutch-engaged state.

As shown in FIG. 15A, the lifter plate 600 preferably includes the same or substantially the same configuration as that of the lifter plate 500 except that the lifter plate 600 does not include the second holding grooves 520 therein (see FIG. 14A).

As shown in FIG. 15A, the reducers 710 in this example embodiment are each the partition wall 584W defining the spring housing 584. As shown in FIGS. 15A and 15B, during the time period until the center-side assist cam surface 60A and the pressure-side assist cam surface 90A approach and contact each other (see FIG. 15B) from a state of being spaced apart from each other in the rotation direction S (see FIG. 15A), the reducer 710 reduces the restoring force of the clutch spring 225 in the direction from the clutch spring 225 toward the center-side assist cam surface 60A (i.e., in the second rotation direction S2). In this example embodiment, during the time period until the center-side assist cam surface 60A and the pressure-side assist cam surface 90A approach and contact each other (see FIG. 15B) from a state of being spaced apart from each other in the rotation direction S (see FIG. 15A), the reducer 710 restricts the inclination of the clutch spring 225, housed in the clutch housing 584, in the rotation direction S. In this example embodiment, during the time period until the center-side assist cam surface 60A and the pressure-side assist cam surface 90A approach and contact each other (see FIG. 15B) from a state of being spaced apart from each other in the rotation direction S (see FIG. 15A), the clutch spring 225 is in contact with the inner circumferential surface 584P of the partition wall 584W in the entirety of the partition wall 584W (i.e., in the entirety of the partition wall 584W in the direction D). Therefore, the clutch spring 225 does not incline, and the restoring force in the direction from the clutch spring 225 toward the center-side assist cam surface 60A (i.e., in the second rotation direction S2) is not generated in the clutch spring 225.

According to the clutch device 610 in this example embodiment, during the time period until the center-side assist cam surface 60A and the pressure-side assist cam surface 90A approach and contact each other from a state of being spaced apart from each other in the rotation direction S, the reducer 710 restricts the inclination of the clutch spring 225, housed in the clutch housing 584, in the rotation direction S. According to this example embodiment, the inclination of the clutch spring 225 in the rotation direction S is prevented by the reducer 710, and therefore, the restoring force in the direction from the clutch spring 225 toward the center-side assist cam surface 60A is not generated in the clutch spring 225.

According to the clutch device in this example embodiment, the reducer 710 is the partition wall 584W defining the clutch housing 584. The clutch spring 225 is in contact with the inner circumferential surface 584P of the partition wall 584W in the entirety of the partition wall 584W. According to this example embodiment, the clutch spring 225 does not incline in the rotation direction S. Therefore, the restoring force in the direction from the clutch spring 225 toward the center-side assist cam surface 60A is not generated in the clutch spring 225.

Example embodiments of the present invention are described above. The above-described example embodiments are merely illustrative, and the present invention may be carried out in any of various other example embodiments.

In example embodiment 1 described above, the end 25A, on the side of the first direction D1, of the clutch spring 25 is secured to the pressure plate 70 by the first holding groove 115. The securing method is not limited to this. For example, the end 25A on the side of the first direction D1 may be secured to the pressure plate 70 by being pasted thereon. A high friction surface may be provided at an area at which the pressure plate 70 and the end 25A on the side of the first direction D1 contact each other to secure the pressure plate 70 and the end 25A to each other. The end 25A on the side of the first direction D1 may be secured to the pressure plate 70 by a projection or the like. The end 25B, on the side of the second direction D2, of the clutch spring 25 may be secured by substantially the same method. In example embodiment 3, the end 25B, on the side of the second direction D2, of the clutch spring 25 may be secured to the clutch center 440, or the end 25A, on the side of the first direction D1, of the clutch spring 25 may be secured to the lifter plate 500, by any of substantially the same methods.

In example embodiment 2 described above, the clutch spring 225 is preferably in contact with the inner circumferential surface 284P of the partition wall 284W in the entirety of the partition wall 284W, so that the inclination of the clutch spring 225 is prevented. The method for preventing or restricting the inclination is not limited to this. For example, the inclination of the clutch spring 225 may be prevented by a projection or the like projecting toward the clutch spring 225 from the inner circumferential surface 284P of the partition wall 284W. In example embodiment 4, the inclination of the clutch spring 225 may be prevented by, for example, a projection or the like projecting toward the clutch spring 225 from the inner circumferential surface 584P of the partition wall 584P.

In example embodiment 2 described above, the clutch spring 225 is in contact with the inner circumferential surface 284P of the partition wall 284W in the entirety of the partition wall 284W, so that the inclination of the clutch spring 225 is prevented. As long as being capable of reducing the restoring force, a slight gap may be provided between an outer circumferential surface of the clutch spring 225 and the inner circumferential surface 284P of the partition wall 284W in the entirety of, or a part of, the partition wall 284W. This is also applicable to example embodiment 4.

In example embodiments 1 through 4 described above, the clutch centers 40, 440 and 540 each hold the output-side rotating plates 22. The clutch center 40, 440 or 540 does not need to hold the output-side rotating plates 22. That is, all the output-side rotating plates 22 may be held by the pressure plate 70, 270 or 470, and none of the clutch centers 40, 440 and 540 needs to hold any of the output-side rotating plates 22.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or block transfer of a rotation driving force of an input shaft to an output shaft, the clutch device comprising:
   a clutch center housed in a clutch housing holding a plurality of input-side rotating plates rotationally drivable by rotational driving of the input shaft, the clutch center being rotationally drivable together with the output shaft;
   a pressure plate movable toward, or away from, and to be rotatable with respect to, the clutch center, the pressure plate holding one or more of a plurality of output-side rotating plates arranged alternately with the plurality of input-side rotating plates, the pressure plate being configured to press the plurality of input-side rotating plates and the plurality of output-side rotating plates;
   a clutch spring to urge the pressure plate in a first direction where the first direction is a direction in which the pressure plate moves toward the clutch center and a second direction is a direction in which the pressure plate moves away from the clutch center; and
   a stopper plate secured to the clutch center to limit movement of the pressure plate away from the clutch center in the second direction by a predetermined distance or longer; wherein
   an end, on the side of the first direction, of the clutch spring is in contact with the pressure plate, and an end, on the side of the second direction, of the clutch spring is in contact with the stopper plate;
   the clutch center includes:
      a center-side assist cam surface to generate a force in a direction from the pressure plate toward the clutch center, in order to increase a pressing force between the plurality of input-side rotating plates and the plurality of output-side rotating plates, when the clutch center rotates with respect to the pressure plate;
the pressure plate includes:
   a pressure-side assist cam surface configured to be contactable with the center-side assist cam surface, and to generate a force in a direction from the pressure plate toward the clutch center in order to increase the pressing force between the plurality of input-side rotating plates and the plurality of output-side rotating plates, when the pressure plate rotates with respect to the clutch center; and
   a housing portion located to the side of the pressure-side assist cam surface in a rotation direction of the pressure plate, the housing portion housing the clutch spring; and
the clutch device includes a reducer to reduce a restoring force of the clutch spring in a direction from the clutch spring toward the pressure-side assist cam surface during a time period until the center-side assist cam surface and the pressure-side assist cam surface approach and contact each other from a state of being spaced apart from each other in the rotation direction.

2. The clutch device according to claim 1, wherein the clutch center is configured to hold the plurality of output-side rotating plates.

3. The clutch device according to claim 1, wherein during the time period until the center-side assist cam surface and the pressure-side assist cam surface approach and contact each other from a state of being spaced apart from each other in the rotation direction, the reducer is configured to restrict inclination of the clutch spring, housed in the housing portion, in the rotation direction.

4. The clutch device according to claim 3, wherein
   the reducer includes a partition wall defining the housing portion; and
   the clutch spring is in contact with an inner circumferential surface of the partition wall in an entirety of the partition wall.

5. The clutch device according to claim 4, wherein
   the housing portion has an inner diameter that is increased in the second direction from the side of the first direction; and
   the clutch spring has a truncated cone shape.

6. The clutch device according to claim 1, wherein
   during the time period until the center-side assist cam surface and the pressure-side assist cam surface approach and contact each other from a state of being spaced apart from each other in the rotation direction, the reducer is configured to restrict movement of the end, on the side of the first direction, of the clutch spring with respect to the pressure plate in the rotation direction and restrict movement of the end, on the side of the second direction, of the clutch spring with respect to the stopper plate in the rotation direction; and
   during the time period until the center-side assist cam surface and the pressure-side assist cam surface approach and contact each other from a state of being spaced apart from each other in the rotation direction, an axis of the clutch spring inclines in a direction from the pressure-side assist cam surface toward the clutch spring as extending in the second direction from the side of the first direction, or is parallel or substantially parallel to a straight line extending in a moving direction in which the pressure plate moves.

7. The clutch device according to claim 6, wherein the reducer is configured to secure the end, on the side of the first direction, of the clutch spring to the pressure plate, and secure the end, on the side of the second direction, of the clutch spring to the stopper plate.

8. The clutch device according to claim 7, wherein the reducer includes:

a first holding groove in the pressure plate, recessed in the first direction from the side of the second direction, and configured to hold the end, on the side of the first direction, of the clutch spring; and a second holding groove in the stopper plate, recessed in the second direction from the side of the first direction, and configured to hold the end, on the side of the second direction, of the clutch spring.

9. A clutch device to allow or block transfer of a rotation driving force of an input shaft to an output shaft, the clutch device comprising:

a clutch center housed in a clutch housing holding a plurality of input-side rotating plates rotationally drivable by rotational driving of the input shaft, the clutch center being rotationally drivable together with the output shaft;

a pressure plate movable toward, or away from, and to be rotatable with respect to, the clutch center, the pressure plate being configured to hold one or more of a plurality of output-side rotating plates alternately arranged with the plurality of input-side rotating plates, the pressure plate being configured to press the plurality of input-side rotating plates and the plurality of output-side rotating plates;

a clutch spring to urge the pressure plate in a first direction where the first direction is a direction in which the pressure plate moves toward the clutch center and a second direction is a direction in which the pressure plate moves away from the clutch center; and a lifter plate secured to the pressure plate to restrict movement of the pressure plate away from the clutch center in the second direction by a predetermined distance or longer; wherein an end, on the side of the first direction, of the clutch spring is in contact with the lifter plate, and an end, on the side of the second direction, of the clutch spring is in contact with the clutch center;

the clutch center includes:

a center-side assist cam surface to generate a force in a direction from the pressure plate toward the clutch center, in order to increase a pressing force between the plurality of input-side rotating plates and the plurality of output-side rotating plates, when the clutch center rotates with respect to the pressure plate; and a housing portion located to the side of the center-side assist cam surface in a rotation direction of the clutch center, the housing portion housing the clutch spring;

the pressure plate includes:

a pressure-side assist cam surface configured to be contactable with the center-side assist cam surface, and to generate a force in a direction from the pressure plate toward the clutch center in order to increase the pressing force between the plurality of input-side rotating plates and the plurality of output-side rotating plates, when the pressure plate rotates with respect to the clutch center; and the clutch device includes a reducer to reduce a restoring force of the clutch spring in a direction from the clutch spring toward the center-side assist cam surface during a time period until the center-side assist cam surface and the pressure-side assist cam surface approach and contact each other from a state of being spaced apart from each other in the rotation direction.

10. The clutch device according to claim 9, wherein the clutch center is configured to hold the plurality of output-side rotating plates.

11. The clutch device according to claim 9, wherein during the time period until the center-side assist cam surface and the pressure-side assist cam surface approach and contact each other from a state of being spaced apart from each other in the rotation direction, the reducer is configured to restrict inclination of the clutch spring, housed in the housing portion, in the rotation direction.

12. The clutch device according to claim 11, wherein:

the reducer includes a partition wall defining the housing portion; and the clutch spring is in contact with an inner circumferential surface of the partition wall in an entirety of the partition wall.

13. The clutch device according to claim 9, wherein during the time period until the center-side assist cam surface and the pressure-side assist cam surface approach and contact each other from a state of being spaced apart from each other in the rotation direction, the reducer is configured to restrict movement of the end, on the side of the first direction, of the clutch spring with respect to the lifter plate in the rotation direction and restrict movement of the end, on the side of the second direction, of the clutch spring with respect to the clutch center in the rotation direction; and during the time period until the center-side assist cam surface and the pressure-side assist cam surface approach and contact each other from a state of being spaced apart from each other in the rotation direction, an axis of the clutch spring inclines in a direction from the center-side assist cam surface toward the clutch spring as extending in the first direction from the side of the second direction, or is parallel or substantially parallel to a straight line extending in a moving direction in which the pressure plate moves.

* * * * *